(12) United States Patent
Jung et al.

(10) Patent No.: US 10,706,083 B2
(45) Date of Patent: Jul. 7, 2020

(54) DIGITAL DEVICE AND METHOD OF PROCESSING DATA THEREIN

(71) Applicant: LG ELECTRONICS INC., Seoul (KR)

(72) Inventors: Eunkyung Jung, Seoul (KR); Seungwon Shin, Seoul (KR); Hyeryoung Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 15/671,421

(22) Filed: Aug. 8, 2017

(65) Prior Publication Data

US 2018/0046702 A1 Feb. 15, 2018

(30) Foreign Application Priority Data

Aug. 9, 2016 (KR) .................. 10-2016-0101141

(51) Int. Cl.
*G06F 17/30* (2006.01)
*G06F 16/31* (2019.01)
*G06F 16/9535* (2019.01)
*G06F 16/2457* (2019.01)

(52) U.S. Cl.
CPC ...... *G06F 16/328* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,583,644 B2* | 11/2013 | Bedingfield, Sr. ... | G11B 27/034 707/736 |
| 10,380,268 B2* | 8/2019 | Yeh ........................ | G06F 16/955 |
| 2010/0211605 A1* | 8/2010 | Ray .................... | H04N 21/4782 707/780 |
| 2011/0119287 A1* | 5/2011 | Chen ...................... | H04L 67/10 707/768 |

(Continued)

FOREIGN PATENT DOCUMENTS

| | | |
|---|---|---|
| JP | 7-210568 A | 8/1995 |
| JP | 2005-310094 A | 11/2005 |

(Continued)

*Primary Examiner* — Hung D Le
(74) *Attorney, Agent, or Firm* — Birch, Stewart, Kolasch & Birch, LLP

(57) ABSTRACT

Disclosed are a digital device and method of processing data therein. The present invention includes a first receiving unit for receiving application data, a second receiving unit for receiving a signal including a request for a search service and search word data for the search service, a memory storing search history data, a controller configured to perform a first operation based on the search word data in response to the received search service request, control to display a first search result data on a screen, if the displayed first search result data is not valid, add the received search word data to the search history data, and control to display a second search result data on the screen by performing a second search based on the search word data included in the search history data after the search service, and a display unit displaying the application data, the first search result data and the second search result data.

9 Claims, 15 Drawing Sheets

(56) References Cited

U.S. PATENT DOCUMENTS

| | | | |
|---|---|---|---|
| 2013/0138673 A1* | 5/2013 | Uemura | H04N 21/4788 707/758 |
| 2013/0298166 A1 | 11/2013 | Herrington et al. | |
| 2014/0258303 A1* | 9/2014 | Gollapudi | G06F 16/951 707/740 |
| 2014/0330813 A1* | 11/2014 | Lee | G06F 16/951 707/722 |
| 2015/0081673 A1* | 3/2015 | Kaneko | H04N 21/44222 707/722 |
| 2015/0154493 A1* | 6/2015 | Yagnik | G06F 16/437 706/14 |
| 2015/0170044 A1* | 6/2015 | Jin | G06F 16/683 706/12 |
| 2015/0254300 A1* | 9/2015 | Yeh | G06F 16/24 707/758 |
| 2016/0350370 A1* | 12/2016 | Bank | G06F 16/2455 |

FOREIGN PATENT DOCUMENTS

| | | |
|---|---|---|
| KR | 10-2010-0078547 A | 7/2010 |
| KR | 10-2011-0117900 A | 10/2011 |
| KR | 10-2014-0066892 A | 6/2014 |

* cited by examiner

FIG. 3
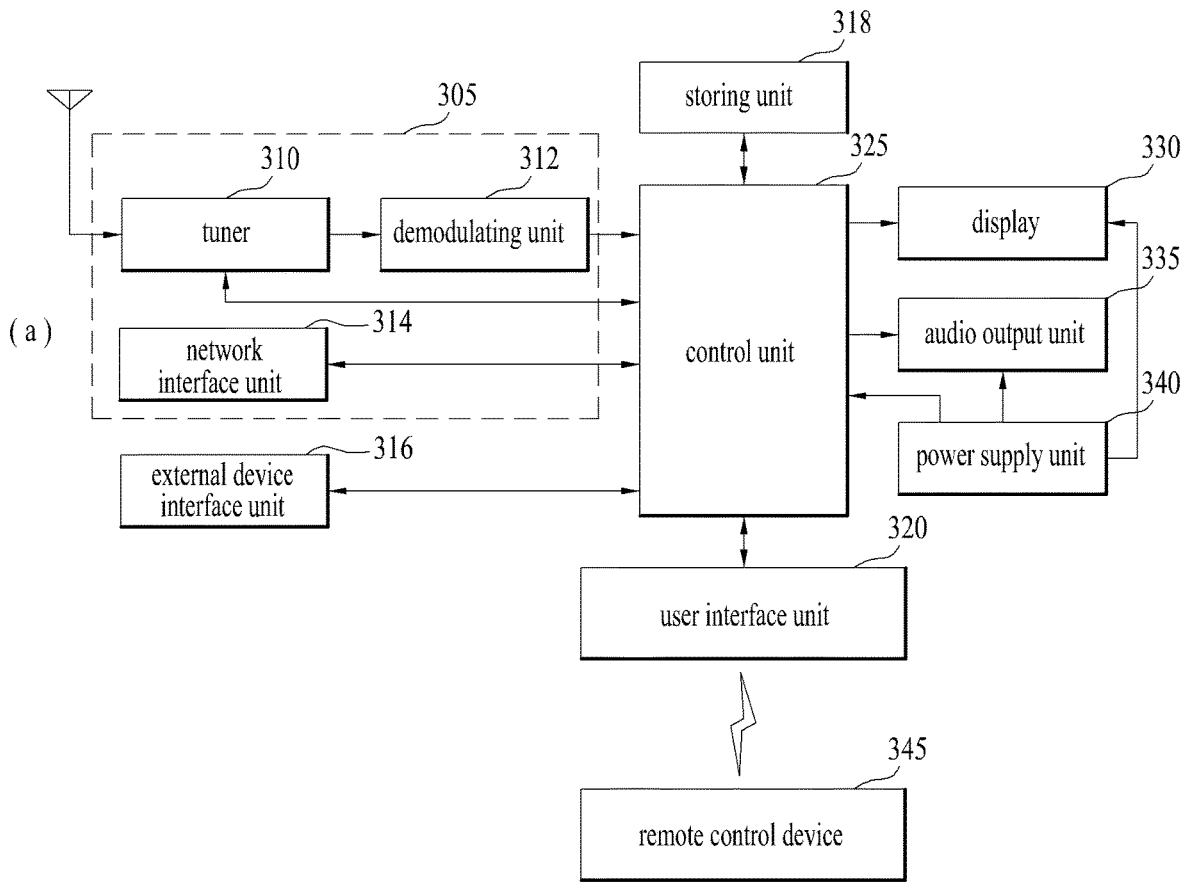
(a)
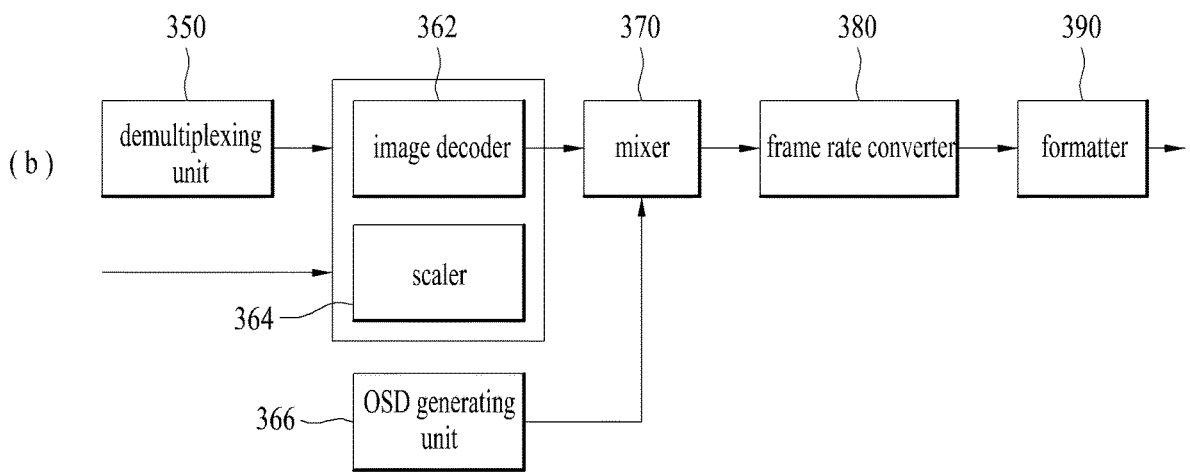
(b)

(a)  (b)

DIGITAL DEVICE AND METHOD OF PROCESSING DATA THEREIN

CROSS REFERENCE TO RELATED APPLICATIONS

Pursuant to 35 U.S.C. § 119(a), this application claims priority under 35 U.S.C. § 119 to Korean Application No. 10-2016-0101141, filed in Korea on Aug. 9, 2016 which is hereby incorporated in its entirety by reference as if fully set forth herein.

BACKGROUND OF THE INVENTION

Field of the Invention

The present invention relates to a digital device, and more particularly, to a search service processing of the digital device.

Discussion of the Related Art

Mobile devices such as a smart phone, a tablet PC, a wearable device and the like are being developed fast as well as standing devices such as a personal computer (PC), a television (TV), a signage and the like. As the digital convergence booms up owing to the developments of mobile devices, a variety of mutual data communications are performed.

A digital TV used to output a broadcast content to a screen by receiving a broadcast signal sent from a broadcasting station only. Recently, a digital TV provides various functions. For instance, a digital TV provides a search service like a PC or mobile terminal. Yet, a related art search service on a digital TV has a problem of low use frequency due to inconvenience of an input interface. Such inconvenience of an input interface for a search service on a digital TV can be settled to some extent using an input means such as a space remote controller, a touchpad included remote controller, or a mobile terminal or various input schemes of voice, gesture and the like as well as a text input through a keyboard. However, since a search service on a digital TV is passive and fails to have a remarkable advantage for a user in comparison with the PC or mobile terminal as well as an advantage of instantaneousness, it is still inconvenient to use the digital TV. For instance, if a user makes a request for a search service by inputting a specific search word, a digital TV provides numerous search results found through various servers only. Hence, it is difficult to quickly find a user-intended search result. And, it is inconvenient to perform a re-search for the search result.

SUMMARY OF THE INVENTION

Accordingly, embodiments of the present invention are directed to a digital device and method of processing data therein that substantially obviate one or more problems due to limitations and disadvantages of the related art.

One object of the present invention is to provide a digital device and method of processing data therein, by which a search service matching a user's intention in a digital device can be provided.

Another object of the present invention is to provide a digital device and method of processing data therein, by which an advanced search service can be provided based on search history data.

Further object of the present invention is to provide a digital device and method of processing data therein, by which product satisfaction and purchase desire can be enhanced in a manner of improving a search service in a digital device through an advanced search service.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of various embodiments for a digital device and method of processing data therein will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a digital device according to one embodiment of the present invention may include a first receiving unit receiving application data, a second receiving unit receiving a signal including a request for a search service and search word data for the search service, a memory storing search history data, a controller configured to perform a first operation based on the search word data in response to the received search service request, control a first search result data to be displayed on a screen, if the displayed first search result data is not valid, add the received search word data to the search history data, and control a second search result data to be displayed on the screen by performing a second search based on the search word data included in the search history data after the search service, and a display unit displaying the application data, the first search result data and the second search result data.

Technical tasks obtainable from the present invention are non-limited by the above-mentioned technical task. And, other unmentioned technical tasks can be clearly understood from the following description by those having ordinary skill in the technical field to which the present invention pertains.

Accordingly, embodiments of the present invention provide various effects and/or features.

According to one of various embodiments of the present invention, a search service matching up to a user's intention in a digital device can be provided.

According to another one of various embodiments of the present invention, which an advanced search service can be provided based on search history data.

According to further one of various embodiments of the present invention, product satisfaction and purchase desire can be enhanced in a manner of improving a search service in a digital device through an advanced search service.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

Arrangements and embodiments may be described in detail with reference to the following drawings in which like reference numerals refer to like elements and wherein:

FIG. 3 is a block diagram showing the configuration of a digital TV according to another embodiment of the present invention.

FIG. 7 (*b*) is a flowchart to describe a search word data validity determining method according to one embodiment of the present invention;

DETAILED DESCRIPTION OF THE INVENTION

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first~', 'second~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies. Meanwhile, the descriptions disclosed in the present specification and/or drawings correspond to one preferred embodiment of the present invention and are non-limited by the preferred embodiment. And, the scope/extent of the right should be determined through the appended claims.

Figure 2:
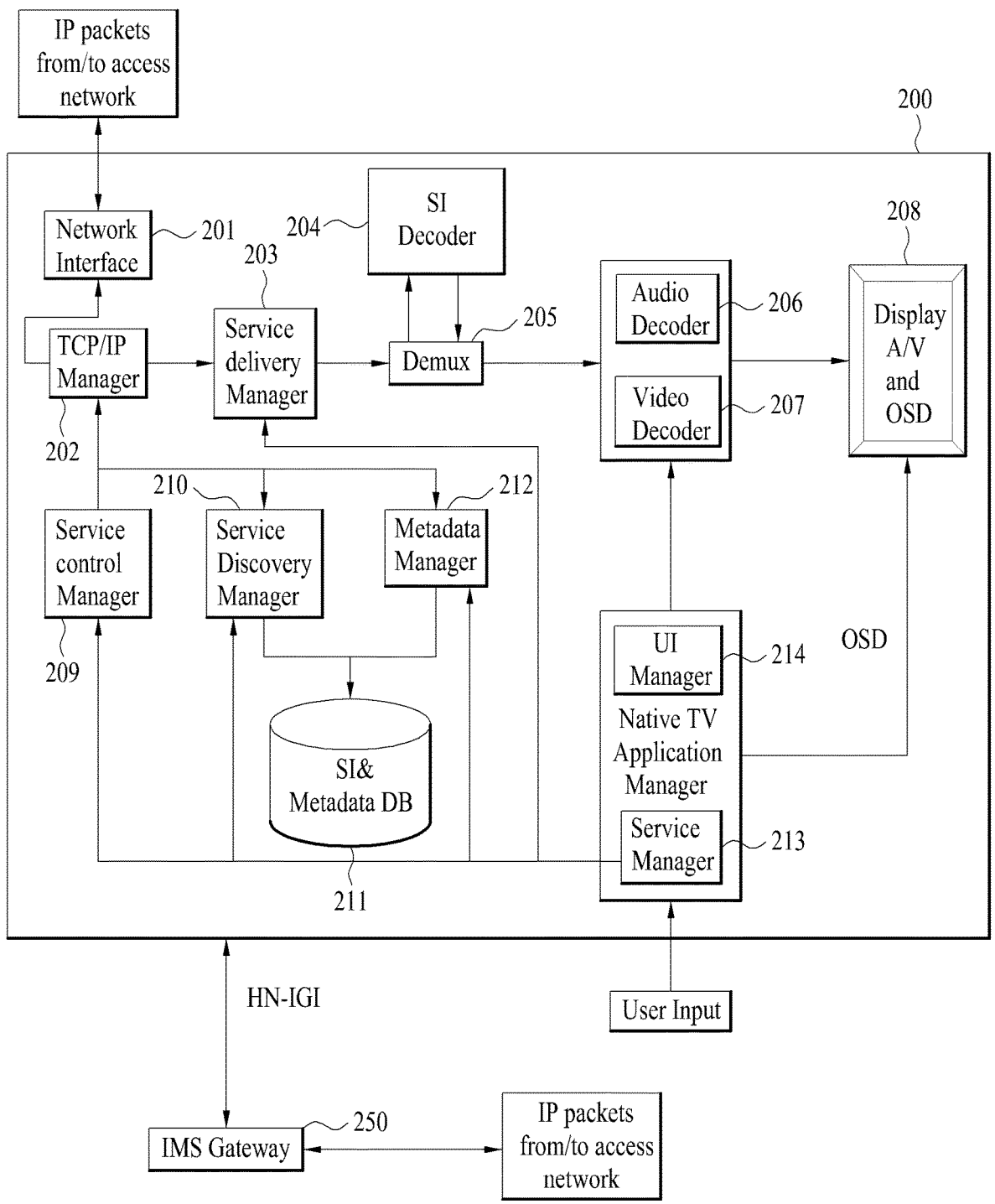
FIG. 2 is a block diagram showing the configuration of a digital TV according to one embodiment of the present invention.
Figure 4:
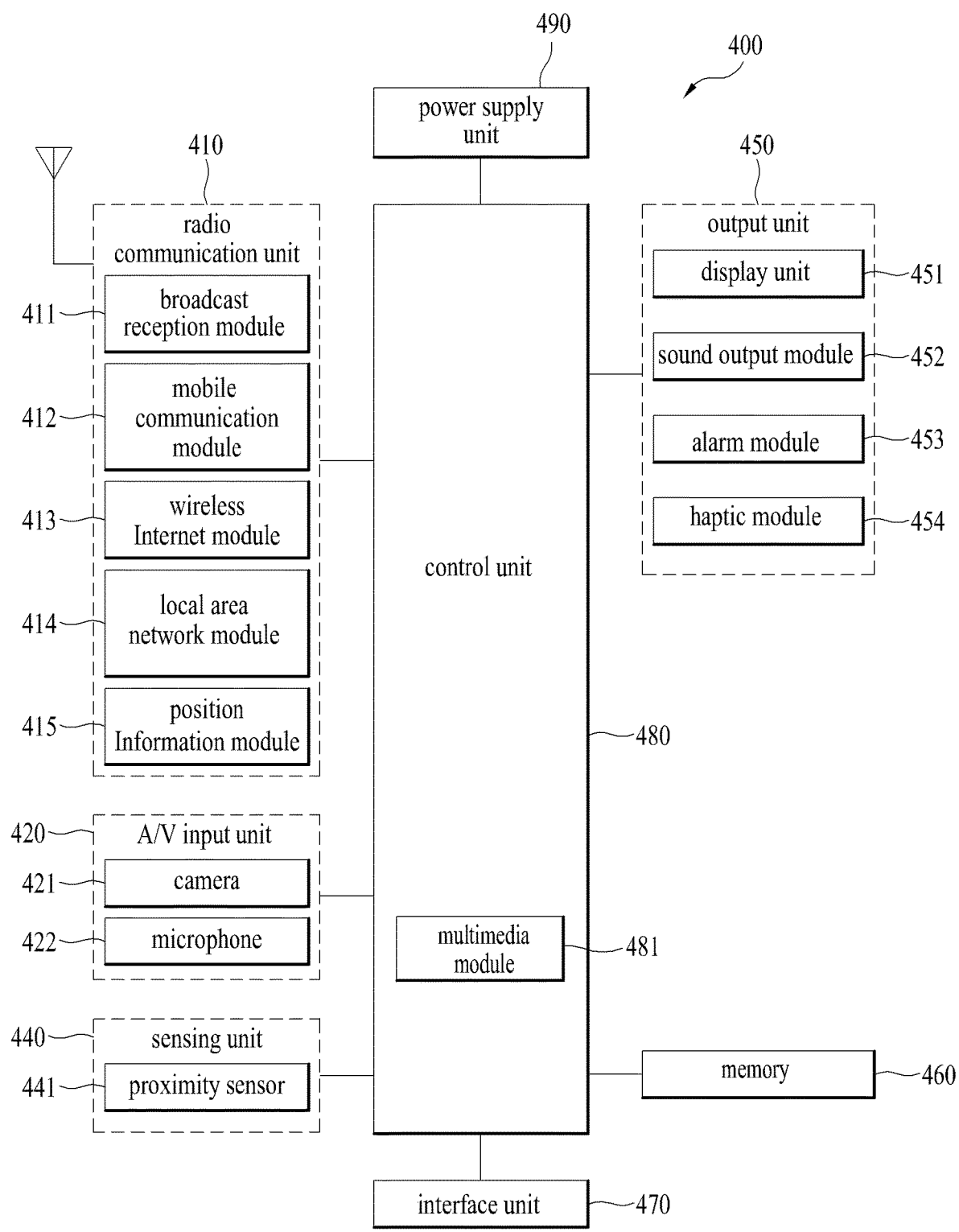
FIG. 4 is a diagram showing the configuration of a mobile terminal according to one embodiment of the present invention.

'Digital device' described in the present specification includes any device capable of performing at least one of transmission, reception, processing and output of contents for example. The digital device can receive the content or information on the content by streaming or download through a server (e.g., a broadcasting station), an external input or the like. The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc. For example of digital devices, FIG. 2 and FIG. 3 show a digital TV as one of the standing devices and FIG. 4 shows a mobile terminal (including a wearable device such as a smart watch) as one of the mobile devices. And, such digital devices shall be described in detail for the corresponding parts. If the digital device is the standing device, it may have include a signage having a display panel only or a SET type with another configuration such as a set-top box (STB) and the like.

Meanwhile, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

Figure 1:
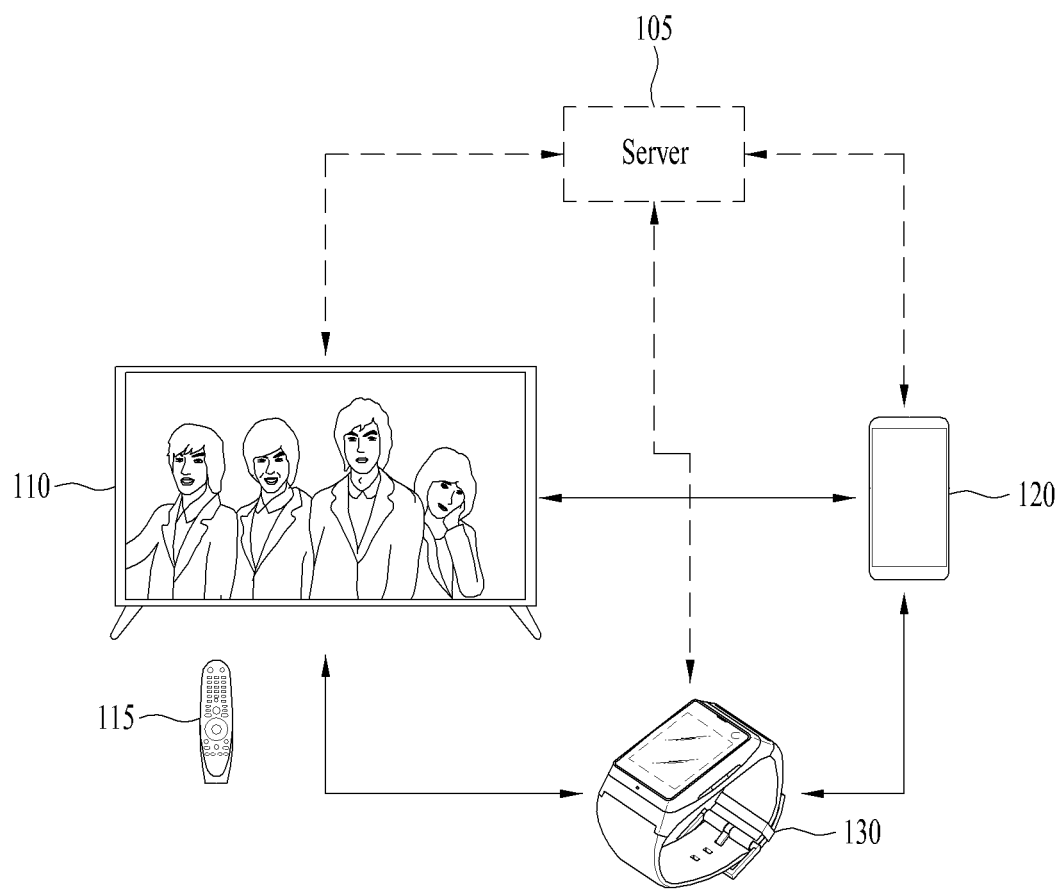
FIG. 1 is a schematic diagram illustrating a service system according to one embodiment of the present invention.

FIG. 1 is a schematic diagram illustrating a service system according to one embodiment of the present invention.

Referring to FIG. 1, a service system may be implemented by including a sever 105 and a digital TV 110. Herein, the digital TV 110 may be substituted with a mobile terminal such as a smartphone 120 or a wearable device 130. Alternatively, the service system may be implemented by including the server 105, the digital TV 110 and the mobile terminals 120 and 130.

FIG. 2 is a block diagram showing the configuration of a digital TV according to one embodiment of the present invention.

The digital TV 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents and the like from the service provider through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

FIG. 3 is a block diagram showing a digital TV according to another embodiment of the present invention.

Another example of a digital TV may include a broadcast receiving unit 305, an external device interface 316, a storage unit 318, a user input interface 320, a controller 325, a display unit 330, an audio output unit 335, a power supply unit 340, and a photographing unit (not shown). Herein, the broadcast receiving unit 305 may include at least one of one tuner 310, a demodulator 312, and a network interface 314. Yet, in some cases, the broadcast receiving unit 305 may include the tuner 310 and the demodulator 312 without the network interface 314, or may include the network interface 314 without the tuner 310 and the demodulator 312. The broadcast receiving unit 305 may include a multiplexer (not shown) to multiplex a signal, which is subjected to the tuner 310 and demodulated by the demodulator 312, and a signal received through the network interface 314. In addition, the broadcast receiving unit 305 can include a demultiplexer (not shown) and demultiplex the multiplexed signal, the demodulated signal, or a signal received through the network interface 314.

The tuner 310 may receive a radio frequency (RF) broadcast signal by tuning in to a channel selected by the user or all previously stored channels among RF broadcast signals received through an antenna. And, the tuner 310 converts the received RF broadcast signal into an IF (intermediate frequency) signal or a baseband signal. For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 310 is able to process both of the digital broadcast signal and the analog signal. The analog baseband video/audio signal (CVBS/SIF) outputted from the tuner 310 may be directly inputted to the controller 325. The tuner 310 may receive an RF broadcast signal of a single carrier or multiple carriers. The tuner 310 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 312 receives and demodulates the digital IF signal (DIF) converted by the tuner 310 and is then able to channel decoding and the like. To this end, the demodulator 312 may include a Trellis decoder, a de-interleaver, a Reed-Solomon decoder and the like, or may include a convolution decoder, a de-interleaver, a Reed-Solomon decoder and the like. The demodulator 312 performs demodulation and channel decoding and is then able to output a stream signal TS (transport stream). In this case, the stream signal may include a signal of multiplexing a video signal, an audio signal and/or a data signal. For instance, the stream signal may include MPEG-2 TS (transport stream) in which a video signal of PMEG-2 and an audio signal of Dolby AC-3 are multiplexed. The stream signal outputted from the demodulator 312 may be inputted to the controller 325. The controller 325 can control demultiplexing, audio/video signal processing, etc. Furthermore, the controller 325 can control outputs of video and audio through the display 330 and the audio output unit 335, respectively.

The external device interface 316 may provide an interfacing environment between the digital device 300 and various external devices. To this end, the external device interface 316 may include an A/V input/output unit (not shown) or a wireless communication unit (not shown). The external device interface 316 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 316 delivers a signal containing data such as an image, a video, an audio and the like, which is inputted through the connected external device, to the controller 325 of the digital TV. The controller 325 may control a data signal of the processed image, video and audio and the like to be outputted to the connected external device. To this end, the external device interface 316 may further include an A/V input/output unit (not shown) or a wireless communication unit (not shown).

In order to input video and audio signals of an external device to the digital TV, the AN input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital TV may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 316 may perform input/output operations with a set-top box (STB) by being connected thereto through at least one of the aforementioned terminals. Meanwhile, the external device interface 316 may receive an application or an application list within an adjacent external device and then forward it to the controller 325 or the storage unit 318.

The network interface 314 may provide an interface for connecting the digital TV to wired/wireless networks including Internet network. The network interface 314 may have Ethernet terminal and the like for an access to a wired network for example. For the access to the wireless network, the network interface 314 may use communication specifications such as WLAN (Wireless LAN) (Wi-Fi), Wibro (Wireless broadband), Wimax (World Interoperability for Microwave Access), HSDPA (High Speed Downlink Packet Access), etc. The network interface 314 may transceive data with another user or another digital device through the accessed network or another network linked to the accessed network. Particularly, the network interface 314 may send a portion of the content data stored in the digital TV to a user/digital device selected from other users/digital devices previously registered at the digital TV. Meanwhile, the network interface 314 may access a prescribed webpage through the accessed network or another network linked to the accessed network. Namely, the network interface 314 accesses a prescribed webpage through a network and is then able to transceive data with a corresponding server. Besides, the network interface 314 can receive contents or data provided by a content provider or a network operator. Namely, the network interface 314 may receive contents (e.g., movie, advertisement, game, VOD, broadcast signal, etc.) provided by the content provider or a network provider and information associated with the contents through the network. The network interface 314 may receive update information and file of firmware provided by the network operator. And, the network interface 314 may send data to the internet or content provider or the network operator. Moreover, the network interface 314 may select a desired application from open applications and receive it through a network.

The storage unit 318 may store programs for various signal processing and controls within the controller 325, and may also store a processed video, audio or data signal. In addition, the storage unit 318 may execute a function of temporarily storing a video, audio or data signal inputted from the external device interface 316 or the network interface 314. The storage unit 318 may store information on a prescribed broadcast channel through a channel memory function. The storage unit 318 may store an application or an application list inputted from the external device interface 316 or the network interface 314. And, the storage unit 318 may store various platforms which will be described later. The storage unit 318 may include storage media of one or more types, such as a flash memory type, a hard disk type, a multimedia card micro type, a card type memory (e.g. SD or XD memory), RAM, EEPROM, etc. The digital TV may play content files (a video file, a still image file, a music file, a text file, an application file, etc.) stored in the storage unit 318 and provide them to the user. FIG. 3 (a) illustrates an embodiment in which the storage unit 318 is separated from the controller 325, by which the present invention is non-limited. In other words, the storage unit 318 may be included in the controller 325.

The user input interface 320 may forward a signal inputted by a user to the controller 325 or forward a signal outputted from the controller 325 to the user. For example, the user input interface 320 may receive control signals for power on/off, channel selection, screen settings and the like from a remote controller 345, or transmit control signals of the controller 325 to the remote controller 345, according to various communication schemes such as RF communication, IR communication, and the like. The user input interface 320 can forward control signals inputted through a power key, a channel key, a volume key, and a local key (not shown) for a setup value or the like to the controller 325. The user input interface 320 may forward a control signal inputted from a sensing unit (not shown) sensing a gesture of a user to the controller 325 or transmit a signal of the controller 325 to the sensing unit (not shown). Here, the sensing unit (not shown) may include a touch sensor, a voice sensor, a location sensor, an action sensor, etc.

The controller 325 may generate and output a signal for a video or audio output by demultiplexing a stream inputted through the tuner 310, the demodulator 312 or the external device interface 316 or processing demultiplexed signals. A video signal processed by the controller 325 can be inputted to the display unit 380 and displayed as an image corresponding to the video signal. In addition, the video signal video-processed by the controller 325 can be inputted to an external output device through the external device interface 316. An audio signal processed by the controller 325 can be audio-outputted to the audio output unit 335. Moreover, the audio signal processed by the controller 325 can be inputted to the external output device through the external device interface 316. The controller 325 may include a demultiplexer, an image processor, and the like, which are not shown in FIG. 3 (a). The controller 325 can control the overall operations of the digital TV. For example, the controller 325 can control the tuner 310 to tune in to an RF broadcast corresponding to a channel selected by a user or a previously stored channel. The controller 325 can control the digital TV according to a user command input through the user input interface 320 or an internal program. Particularly, the controller 325 can control the digital TV to access a network to download an application or an application list desired by a user to the digital TV. For example, the controller 325 may control the tuner 310 to receive a signal of a channel selected in response to a prescribed channel selection command received through the user input interface 320. And, the controller 325 may process a video, audio or data signal of the selected channel. The controller 325 may control information on a channel selected by the user to be outputted together with a processed video or audio signal through the display unit 330 or the audio output unit 335. For another example, the controller 325 may control a video signal or an audio signal, which is inputted through the external device interface unit 316 from an external device (e.g., a camera or a camcorder), to be outputted through the display unit 330 or the audio output unit 335 in response to an external device image play command received through the user input interface 320. Meanwhile, the controller 325 can control the display unit 330 to display a video. For example, the controller 325 can control a broadcast video inputted through the tuner 310, an external input video inputted through the external device interface 316, a video inputted through the network interface 430, or a video stored in the storage unit 440 to be displayed on the display unit 330. Here, the video displayed on the display unit 330 may include a still image or moving images or may include a 2D or 3D video. The controller 325 may control a content to be played. Here, the content may include a content stored in the digital TV, a received broadcast content, or a content inputted externally. The content may include at least one of a broadcast video, an external input video, an audio file, a still image, an accessed web screen, and a document file. The controller 325 may control an application or an application list, which is located in the digital device 300 or downloadable from an external network, to be displayed when an application view menu is entered. The controller 325 may control installation and execution of applications downloaded from an external network together with various user interfaces. Moreover, the controller 325 can control a video related to a launched application to be displayed on the display unit 330 by a user's selection.

Meanwhile, a channel browsing processor (not shown) configured to generate a thumbnail image corresponding to a channel signal or an external input signal may be further included. The channel browsing processor may receive an input of a stream signal (TS) outputted from the demodulator 312 or an input of a stream signal outputted from the external device interface 316, extract a video from the inputted stream signal, and then generate a thumbnail image. The generated thumbnail image can be directly inputted to the controller 325 or may be inputted to the controller 325 by being encoded. Moreover, the generated thumbnail image may be encoded into a stream and then inputted to the controller 325. The controller 325 may display a thumbnail list including a plurality of thumbnail images on the display unit 330 using the inputted thumbnail images. The thumbnail images included in the thumbnail list can be updated sequentially or simultaneously. Accordingly, the user can conveniently check content of a plurality of broadcast channels.

The display unit 330 may convert each of a video signal, a data signal, and an OSD signal processed by the controller 325 or each of a video signal and a data signal received from the external device interface 316 into R, G and B signals to generate a drive signals. The display unit 330 may include PDP (Plasma Display Panel), LCD (Liquid Crystal Display), OLED (Organic Light Emitting Diode), a flexible display, a 3D display, or the like. The display unit 330 may be configured as a touchscreen and used as an input device as well as an output device. The audio output unit 335 receives a signal audio-processed by the controller 325, for example, a stereo signal, a 3.1 channel signal or a 5.1 channel signal, and then outputs the received signal as audio. The audio output unit 335 may be configured as one of speakers of various types.

Meanwhile, the digital TV may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 325 through the user input interface 320. The digital TV may further include a photographing unit (not shown) for photographing a user. Image information acquired by the photographing unit (not shown) can be inputted to the controller 325. The controller 325 may sense a gesture of a user from an image captured by the photographing unit (not shown) or a signal sensed by the sensing unit (not shown), or by combining the image and the signal.

The power supply unit 340 may supply a corresponding power to the digital TV overall. Particularly, the power supply unit 340 can supply the power to the controller 325 configurable as a system-on-chip (SoC), the display unit 330 for a video display, and the audio output unit 335 for an audio output. To this end, the power supply unit 340 may include a converter (not shown) configured to convert an AC power to a DC power. Meanwhile, for example, if the display unit 330 is configured as an LCD panel having a multitude of backlight lamps, the power supply unit 340 may further include an inverter (not shown) capable of PWM (pulse width modulation) operation for luminance variation or dimming drive.

The remote controller 345 sends a user input to the user input interface 320. To this end, the remote controller 345 can use Bluetooth, RF communication, IR communication, UWB. ZigBee, etc. In addition, the remote controller 345 can receive audio, video or data signal outputted from the user input interface 320 and then display the received signal or output the same as audio or vibration.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Referring to FIG. 3 (b), one example of the controller may include a demultiplexer 350, a video processor, an OSD generator 366, a mixer 370, a frame rate converter (FRC) 380, and a formatter 390. Besides, the controller may further include an audio processor and a data processor (not shown).

The demultiplexer 350 demultiplexes an inputted stream. For instance, the demultiplexer 350 can demultiplex an inputted stream signal into an MPEG-2 TS video, audio and data signals. Herein, the stream signal inputted to the demultiplexer may include a stream signal outputted from the tuner, demodulator or external device interface.

The video processor performs a video processing of the demultiplexed video signal. To this end, the video processor may include a video decoder 362 and a scaler 364. The video decoder 362 can decode the demultiplexed video signal, and the scaler 364 can scale the resolution of the decoded video signal to be outputtable from the display. The video decoder 362 can support various specifications. For instance, the video decoder 362 performs a function of MPEG-2 decoder if a video signal is encoded by MPEG-2. And, the video decoder 364 performs a function of H.264 decoder if a video signal is encoded by DMB (digital multimedia broadcasting) or H.264. Meanwhile, the video signal decoded by the image processor is inputted to the mixer 370.

The OSD generator 366 may generate OSD data according to a user input or by itself. For example, the OSD generator 366 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 366 can generate data to display a caption of a broadcast video or EPG based broadcast information.

The mixer 370 mixes the OSD data generated by the OSD generator 366 and the video signal processed by the video processor. The mixer 370 then provides the mixed signal to the formatter 390. By mixing the decoded video signal and the OSD data, OSD is displayed in a manner of overlaying a broadcast video or an external input video.

The frame rate converter (FRC) 380 may convert a frame rate of an inputted video. For example, the frame rate converter 380 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 380 can perform the conversion by inserting a first frame between the first frame and a second frame or inserting a third frame predicted from the first and second frames. For another instance, in case of converting a frame rate into 240 Hz from 60 Hz, the frame rate converter 380 can perform the conversion by further inserting three same or predicted frames between the existing frames. Meanwhile, in case of not performing a separate frame conversion, the frame rate converter 380 may be bypassed.

The formatter 390 may change the output of the frame rate converter 380, which is inputted thereto, to fit an output format of the display unit. For example, the formatter 390 can output an RGB data signal. In this case, this RGB data signal can be outputted as low voltage differential signal (LVDS) or mini-LVDS. If an inputted output of the frame rate converter 380 is a 3D video signal, the formatter 390 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal. And, the audio processor (not shown) in the controller can process base, treble, volume adjustment and the like. A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital TV is one example according to the present invention. And, at least one of the components may be integrated, added or omitted depending on options of an actually embodied digital TV. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention. Meanwhile, a digital TV may include an image signal processing device configured to process a signal of an image saved in the corresponding device or a signal of an inputted image. Examples of the image signal processing device may include a settop box (STB) failing to include the display unit 330 and the audio output unit 335 shown in FIG. 3 (*a*), the aforementioned DVD player, a Blu-ray player, a game device, a computer and the like.

FIG. 4 is a block diagram showing the configuration of a mobile terminal according to one embodiment of the present invention.

Referring to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, etc.

The wireless communication unit 410 typically includes one or more modules which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, a location information module 415, etc.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 412. The broadcast associated information can be implemented in various forms, e.g., an electronic program guide (EPG), an electronic service guide (ESG), and the like. The broadcast receiving module 411 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like. Optionally, the broadcast receiving module 411 can be configured to be suitable for other broadcasting systems as well as the above-noted digital broadcasting systems. The broadcast signal and/or broadcast associated information received by the broadcast receiving module 411 may be saved to the memory 460.

The mobile communication module 412 transmits/receives wireless signals to/from at least one of a base station, an external terminal, and a server via a mobile network. Such wireless signals may carry audio signals, video signals, and data of various types according to transceived text/multimedia messages.

The wireless Internet module 413 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 414 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 415 is a module for obtaining location information of the mobile terminal 100. And, this module may be implemented with a global positioning system (GPS) module for example.

The audio/video (A/V) input unit 420 is configured to provide audio or video signal input. The AN input unit 420 may include a camera 421, a microphone 422 and the like. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or transmitted externally via the wireless communication unit 410. Optionally, at least two cameras 421 can be provided according to the environment of usage.

The microphone 422 receives an external audio signal in call mode, recording mode, voice recognition mode, or the like. This audio signal is processed and converted into electrical audio data. The processed audio data is transformed into a format transmittable to a mobile communication base station via the mobile communication module 412 in call mode. The microphone 422 typically includes assorted noise cancelling algorithms to cancel noise generated in the course of receiving the external audio signal.

The user input unit 430 generates input data for a user to control an operation of the terminal. The user input unit 430 may include a keypad, a dome switch, a touchpad (e.g., static pressure/capacitance), a jog wheel, a jog switch, and/or the like.

The sensing unit 440 generates sensing signals for controlling operations of the mobile terminal 400 using status measurements of various aspects of the mobile terminal. For instance, the sensing unit 440 may detect an open/closed status of the mobile terminal 400, a location of the mobile terminal 400, an orientation of the mobile terminal 400, a presence or absence of user contact with the mobile terminal 400, an acceleration/deceleration of the mobile terminal 400, and the like. For example, if the mobile terminal 400 is moved or inclined, it is able to sense a location or inclination of the mobile device. Moreover, the sensing unit 440 may sense a presence or absence of power provided by the power supply unit 490, a presence or absence of a coupling or other connection between the interface unit 470 and an external device, and the like. Meanwhile, the sensing unit 440 may include a proximity sensor 441 such as NFC (near field communication) and the like.

The output unit 450 generates output relevant to the senses of vision, hearing and touch, and may include the display 451, an audio output module 452, an alarm unit 453, a haptic module 454, and the like.

The display 451 is typically implemented to visually display (output) information processed by the mobile terminal 400. For instance, if the mobile terminal is operating in phone call mode, the display will generally provide a user interface (UI) or graphical user interface (GUI) related to a phone call. For another instance, if the mobile terminal 400 is in video call mode or photographing mode, the display 451 may display photographed or/and received images or UI/GUI.

The display module 451 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 451 can be implemented as the optical transmittive type as well. In this configuration, a user may be able to see an object located in rear of a terminal body through a region occupied by the display 451 of the terminal body.

Two or more displays 451 can be provided to the mobile terminal 400 in accordance with an implementation type of the mobile terminal 400. For instance, a plurality of displays can be disposed on the mobile terminal 400 in a manner of being spaced apart from a single face or being integrally formed on a single face. Alternatively, a plurality of displays may be disposed on different faces of the mobile terminal 400, respectively.

If the display 451 and a sensor (hereinafter called 'touch sensor') for detecting a touch action configure a mutual layer structure, the display 451 is usable as an input device as well as an output device. In this case, the touch sensor can be configured with a touch film, a touch sheet, a touchpad, or the like.

The touch sensor can be configured to convert a pressure applied to a specific portion of the display 451 or a variation of capacitance generated from a specific portion of the display 451 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 480. Therefore, the controller 480 is able to know whether a prescribed portion of the display 451 is touched.

A proximity sensor 441 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or stored in the memory 460. During operation, the audio output module 452 may output an audio signal related to a function (e.g., call received, message received) executed in the mobile terminal 400. The audio output module 452 may include a receiver, a speaker, a buzzer and the like.

The alarm unit 453 outputs a signal for announcing the occurrence of an event of the mobile terminal 400. Typical events occurring in the mobile device may include a call signal received, a message received, a touch input received, and the like. The alarm unit 453 may output a signal for announcing the event occurrence by way of vibration as well as video or audio signal. The video or audio signal can be outputted via the display 451 or the audio output module 452. Hence, the display 451 or the audio output module 452 can be sorted into a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output in a manner of being synthesized together or can be output in sequence. The haptic module 454 is able to generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, two or more haptic modules 454 can be provided to the mobile terminal 400 in accordance with a configuration type of the mobile terminal 400.

The memory 460 may store a program for an operation of the controller 480, or may temporarily store inputted/outputted data (e.g., phonebook, message, still image, video, etc.). And, the memory 460 may store data of vibrations and sounds of various patterns outputted in response to a touch input to the touchscreen.

The memory 460 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 400 is able to operate in association with the web storage for performing a storage function of the memory 460 on the Internet.

The interface unit 470 may play a role as a passage to every external device connected to the mobile terminal 400 with external devices. The interface unit 470 receives data from the external devices, delivers a supplied power to the respective elements of the mobile terminal 400, or enables data within the mobile terminal 400 to be transferred to the external devices. For instance, the interface unit 470 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 400 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 400 through a port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals inputted from the cradle or the power can operate as a signal for recognizing that the mobile terminal 400 is correctly installed in the cradle.

The controller 480 typically controls the overall operations of the mobile terminal 400. For example, the controller 480 performs the control and processing associated with voice calls, data communications, video calls, and the like. The controller 480 may include a multimedia module 481 that provides multimedia playback. The multimedia module 481 may be configured as a part of the controller 480, or implemented as a separate component. Moreover, the controller 480 is able to perform a pattern recognition processing for recognizing a writing input and a picture drawing input performed on the touchscreen as a text and an image, respectively.

The power supply unit 490 is supplied with an external or internal power and then supplies a power required for an operation of each component, under the control of the controller 480.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 480.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 414 may detect (or recognize) a communication enabled wearable device around. If the detected wearable device is a device authenticated to communicate with the mobile terminal 400, the controller 480 may send at least one portion of data processed in the mobile terminal 400 to the wearable device. Hence, a user can use the data processed in the mobile terminal 400 through the wearable device. For instance, if an incoming call is received by the mobile terminal 400, a phone call is performed through the wearable device. If a message is received by the mobile terminal 400, the received message can be checked through the wearable device.

Figure 5:
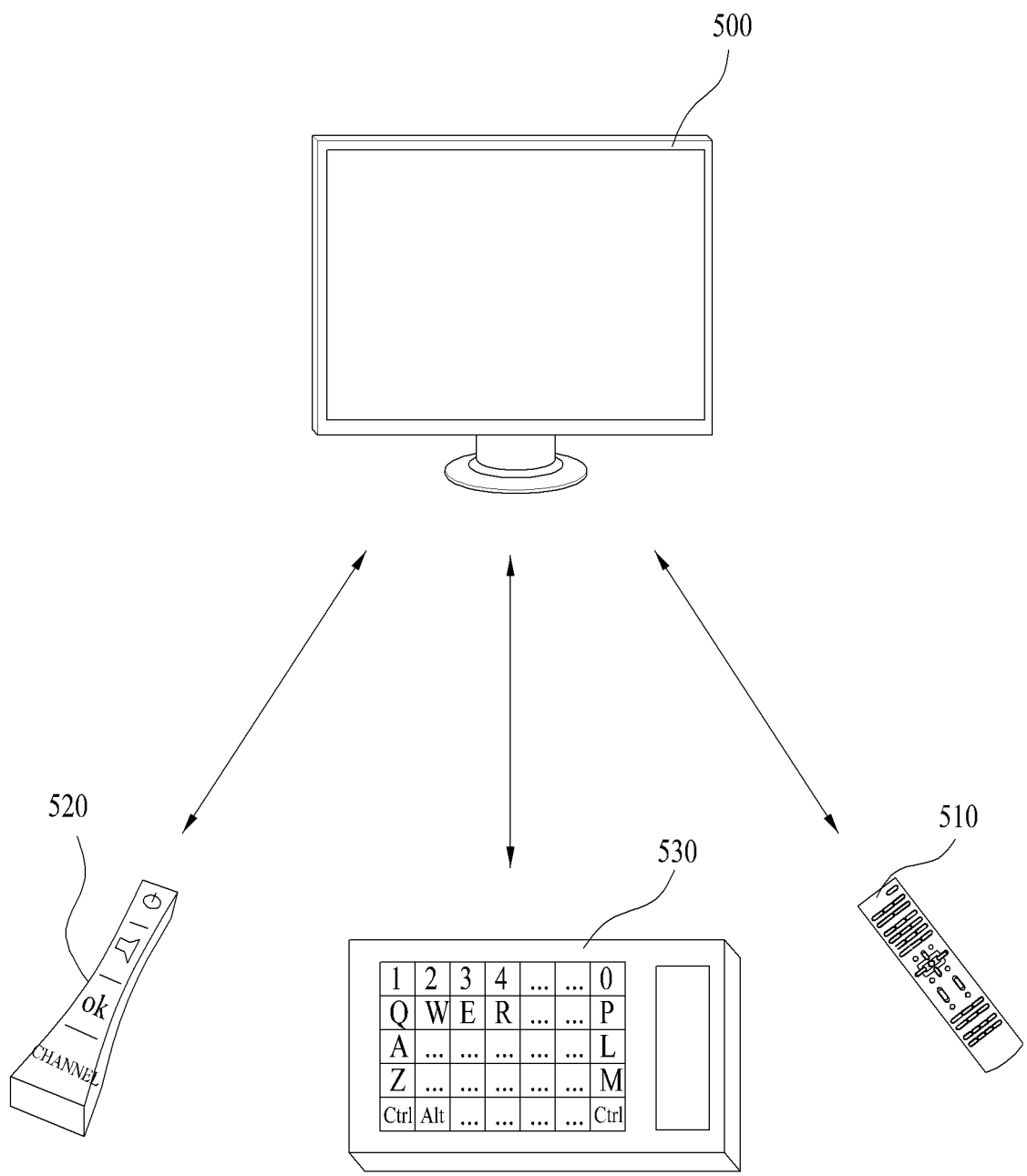
FIG. 5 is a diagram showing a control means for controlling a digital device according to one embodiment of the present invention.

FIG. 5 is a diagram showing a control means for controlling a digital device according to one embodiment of the present invention.

In order to control a digital device 500, a front panel (not shown in the drawing) or a control means (e.g., an input means) installed in the digital device 500 is used.

Meanwhile, as a user interface device (UID) capable of a wire/wireless communication, the control means includes a remote controller 510, a pointing device 520, a key board 530, a touchpad, or the like, mainly embodied for the purpose of controlling the digital device 500. And, an external device such as the mobile terminal 120/130 shown in FIG. 1, which is connected or connectible to the digital device 500, may be included in the control means. Meanwhile, in the above description, the mobile terminal 120/130 may control the digital device using an application installed by being downloaded from or through an external server (e.g., the server 105 of FIG. 1 inclusive).

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee. DLNA (Digital Living Network Alliance), RS, LTE and the like.

In the following, various embodiments for a search service processing method in a digital device according to the present invention are described in detail with reference to the accompanying drawings.

As described above, a digital TV manually performs a search operation in response to a user's search service request and then provides search result data to a screen only. In doing so, the digital TV displays all the found search result data on the screen at a time without filtering. In some cases, since it is difficult for the user to directly recognize a desired search result data, an additional action (e.g., searching a search result, re-searching from the beginning, etc.) may be required. To this end, some of the search result data may be filtered in a digital device. Yet, the digital TV is still unable to actively provide a search service until receiving an addition request or the like except the aforementioned search service process. For instance, a digital TV provides search result data according to a search result for a specific search word in response to a user's request. If there is no user-desired result from the provided search result data, the digital TV takes no action. For instance, unless the user makes a request for a re-search for the specific search word, the digital TV does not perform a search for the search word additionally.

Therefore, in this disclosure, according to one embodiment of the present invention, in order to provide a search service matching up to a user's intention in a digital device, an advanced search service is provided based on search history data.

Herein, the advanced search service can be classified into a case of a search service requested by a user or a case of a search service not requested by a user. The former may include an embodiment of a case of a search service requested by a user by directly inputting a search word. The latter may include an embodiment of a case of a search service provided on the basis of a user's viewing pattern or the like in a digital TV despite that the user does not make a search request in direct.

For clarity, in the present specification, a digital device may include a digital TV, an input means may include a remote controller or a mobile terminal on which an application for controlling the remote controller is installed, and an external device may include a mobile terminal, for example. The mobile terminal corresponding to the external device may include the same device of the mobile terminal as the input means or a totally new mobile terminal.

Meanwhile, in the present specification, a mobile terminal may simply means a mobile terminal on which an application for controlling the remote controller is installed. For clarity, although a mobile terminal is described as one of input means, since a remote controller is used as the input means despite not mentioning a remote controller specially, the meaning of the mobile terminal may include the remote controller. Besides, an application of a mobile terminal may mean a digital TV control application unless mentioned specially.

A digital device according to one embodiment of the present invention may include a first receiving unit receiving application data, a second receiving unit receiving a signal containing a search service request and search word data for a search service, a memory storing search history data, a controller configured to perform a first operation based on the search word data in response to the received search service request, control a first search result data to be displayed on a screen, if the displayed first search result data is not valid, add the received search word data to the search history data, and control a second search result data to be displayed on the screen by performing a second search based on the search word data included in the search history data after the search service, and a display unit displaying the application data, the first search result data and the second search result data. Herein, the second search may be automatically performed based on the search history data without a user's search service request.

Figure 6:
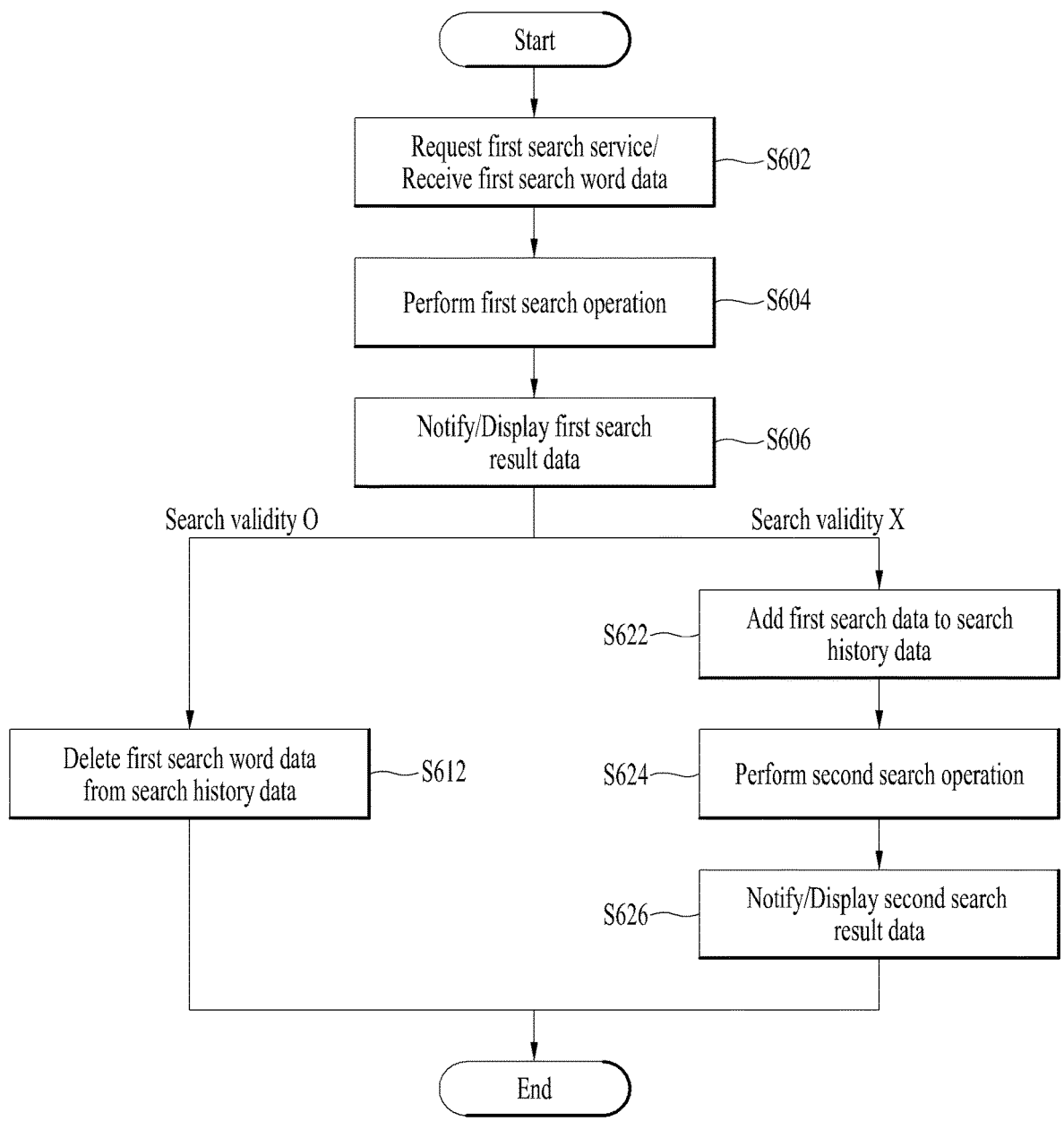
FIG. 6 is a flowchart to describe a search service providing method in a digital TV according to one embodiment of the present invention.

FIG. 6 is a flowchart to describe a search service providing method in a digital TV according to one embodiment of the present invention.

A search service in a digital TV includes a search request, a search operation and a search result providing process.

A digital TV receives a first search service request and a first search word data [S602].

The digital TV performs a first search operation through at least one server based on the first search word data received in the step S602. If a single server is used for the first search operation, it may be a default server for a search for example.

The digital TV receives a result of performing the first search operation in the step S604 and displays a first result data on the screen [S606]. In doing so, a content, an application and the like stored in an internal memory (including an external memory and the like connected to the digital TV) may be displayed on the digital TV in a manner of being included in the first search result data.

The digital TV determines validity of the first search result according to the step S606. The search validity determination shall be described in detail later and its details are omitted here.

If determining that the first search operation or the first search result data is valid, the digital TV deletes the first search word data from the search history data stored in the memory [S612]. In doing so, with respect to the search validity determination, if there is an item selected from the first search result data, the digital TV may launch and display an application corresponding to the selected item.

If determining that the first search operation or the first search result data is not valid, the digital TV performs the following operation.

First of all, the digital TV adds the first search word data to the search history data stored in the memory [S622].

Thereafter, the digital TV periodically/aperiodically performs a second search operation through at least one server based on the first search word data added to the search history data [S624]. Herein, the second search operation may be performed not only on the first search word data but also on one or more search word data included in the search history data. Meanwhile, the second search operation may be automatically performed in the digital TV without a user's separate search service request or setting or the like. The second search operation may be performed after an end timing of the first search service at least. The at least one server for the second search operation may or may not include the server for the first search operation, for example.

The digital TV receives a result of performing the second search operation from the at least one server and then notifies/displays a second search result data on the screen [S626].

The digital TV may identically determine search result validity for the second search result data and then repeat the process equal or similar to the step S612 or the steps S622 to S626 according to a result of the determination.

Meanwhile, at least one of the above-mentioned processes may be performed by a controller of the digital TV.

With respect to the search result validity determination, if any item is not selected from one or more items included in the search result data, the controller of the digital TV may determine that the corresponding search result data is not valid.

Although at least one item is selected from one or more items included in the search result data, if an application corresponding to the selected item is not played over a predetermined time, the controller may determine that the corresponding search result data is not valid as well.

While the search result data is displayed, if a new search service request is received within a predetermined time, the controller may determine that the corresponding search result data is not valid as well. Herein, the new search service request may include search word data similar to the search word data or totally new search word data.

The controller determines whether an item for an application having a previously watched history is included in the search result data. As a result, if an item for an application having a previously watched history is included in the search result data, the controller may determine whether series information is included in the search result data. If the search result data fails to include the series information, the controller may delete the search data from the search history data. If the search result data includes the series information, the controller may update the search history data as well as the search data including the series information.

Meanwhile, if a plurality of the first or second search result data exist, the controller can process the predetermined number of the search result data or the search result data having a priority equal to or higher than a predetermined priority among a plurality of the search result data so that a content/application selected by a user from the search result data can be directly playable without buffering using a preloading technology.

If a plurality of the second search result data exist, the controller may notify the second search result data having a highest priority among a plurality of the second result data. If the notified second search result data having the highest priority is selected, the controller may control all of a plurality of the second search result data to be displayed according to the selection.

The controller can filter the search result data having a full play time within a predetermined time range among the first search result data from the second search result data.

Moreover, the controller may control a pay data among the first or second search result to be filtered or have a low priority. Yet, if a user of the digital TV or a search service user is a pay service subscriber, the controller may control the pay data in reverse order.

Meanwhile, regarding a search operation or a search server, the controller may receive the first search result data from a first server and also receive the second search result data from all connectible servers. Herein, the second search result data may be obtained through other servers except the first server. The controller may receive the search result data from a server providing the specific application only. The controller can control at least one of data related to a search time, a search method, a search service requesting user, a search server and a search related data to be saved to the search history data. And, the controller may determine a server to search for the search word data based on the search history data.

Meanwhile, if a specific application is watched over a prescribed time, the controller may determine whether the saved search related data saved from the search history data exists. If the saved search related data saved from the search history data exists, the controller may automatically perform a search service and notify/display the search result data on the screen. The controller may notify/display the search result data only if an end of the specific application is requested or it is a time within a predetermined time before an end hour in the full playable time.

Besides, if the application data is being played over a prescribed time, the controller may send at least one of the first and second search result data to the external device. If an external device having newly entered an AP (access point) for the digital device exists, the controller may automatically perform the search service by referring to search service request user data in the search history data. The controller may notify/display the search result data according to the automatically performed search service on the external device having newly entered the AP for the digital device.

Figure 7:
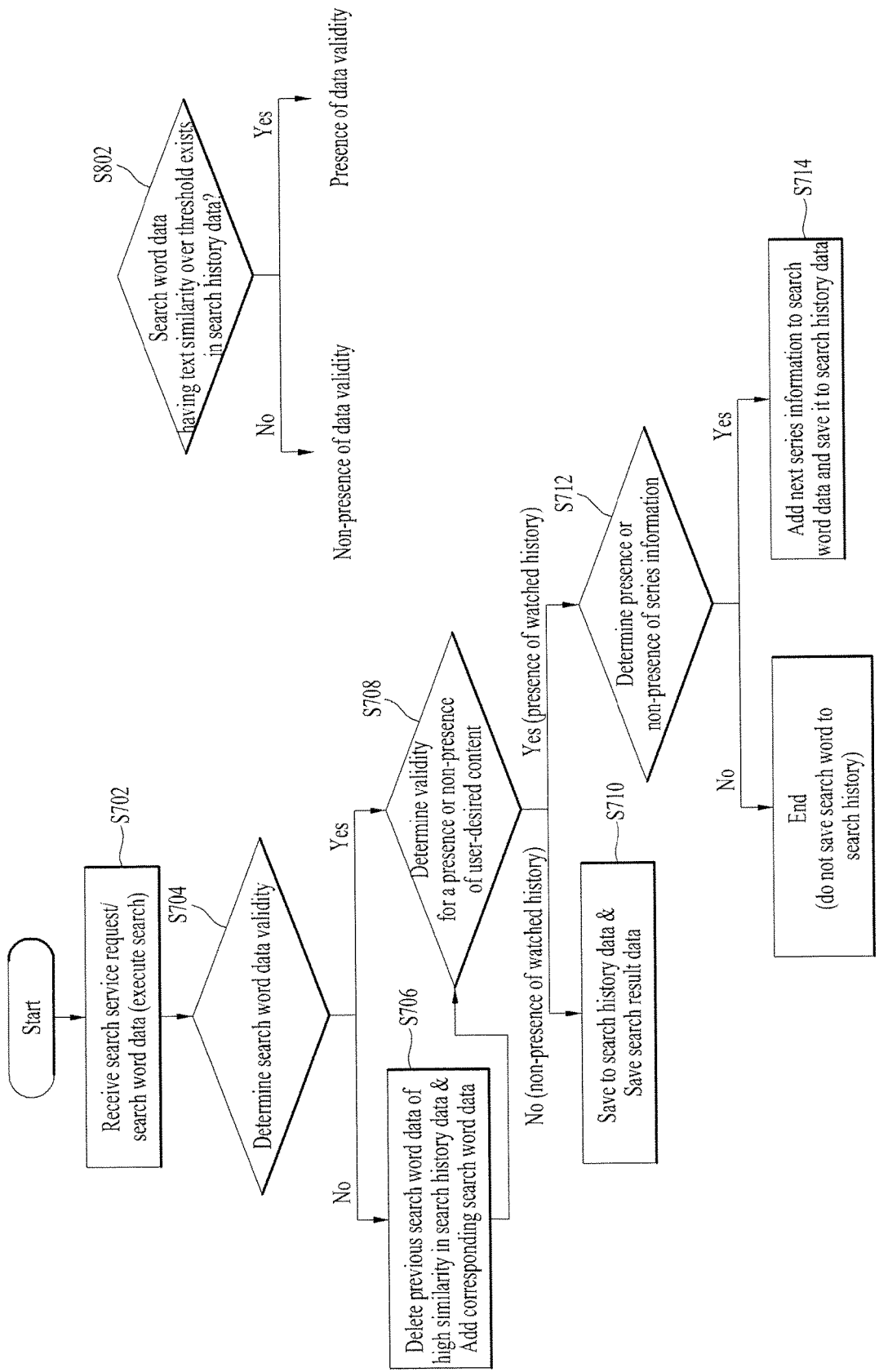
FIG. 7 (*a*) is a flowchart to describe a search service providing method in a digital TV according to another embodiment of the present invention.

FIG. 7 (*a*) is a flowchart to describe a search service providing method in a digital TV according to another embodiment of the present invention, and FIG. 7 (*b*) is a flowchart to describe a search word data validity determining method according to one embodiment of the present invention.

A digital TV receives a search service request and search word data [S702].

The digital TV determines validity of the search word data received in the step S702 [S704].

Herein, for example, the digital TV may use search history data, as shown in FIG. 7 (*b*), as the step S704, i.e., one of methods for search word data validity determination. For instance, the digital TV may compare the received search word data with search word data included in the search history data.

If at least one search word data, of which text similarity to the received search word data is equal to or greater than a threshold (e.g., 50%) exists in the search history data, the digital TV determines the received search word data as a valid search word data. Otherwise, the digital TV may determine the received search word data as an invalid search word data [S802].

As a result of the determination in the step S704, if the search word data is not valid, the digital TV deletes a previous search word data having similarity of the text data in the search word history data from the search word history data and adds the received search word data to the search word history data [S706]. For clarity, 'validity' is represented and used for clarity. This may determine whether a received search word data is a new search word data for example.

On the other hand, as a result of the determination in the step S704, if the search word data is valid, the digital TV may determine search validity [S708]. Herein, the search validity determination may include determining whether a user-desired content is included from the search result data for example.

The digital TV may determine such search validity based on a presence or non-presence of a previously watched history. For instance, if there is no previously watched history for an application related to at least one item in the search result data, the digital TV may regard the corresponding search as invalid. Hence, the digital TV saves the corresponding search result to the search history data and also saves the received search word data together [S710].

On the other hand, if there is a previously watched history for an application related to at least one item in the search result data, the digital TV may determine the corresponding search as valid. In doing so, the digital TV may additionally determine whether the search word data includes series information [S712].

As a result of the determination in the step S712, if the series information is not included, the digital TV does not save the received search word data to the search history data but may end the search service.

On the other hand, as a result of the determination in the step S712, if the series information is included, the digital TV may search and display series search result data together based on the received search data. Meanwhile, the digital TV may add the series information to the search history data together with the received search word data [S714].

Meanwhile, in the present specification, such terminologies as 'valid'. 'validity' and the like may have meanings different from those of 'valid' and 'validity' in a general sense. For instance, if data is not desired by a user despite having no problem, such data may be represented as invalid.

Figure 8:
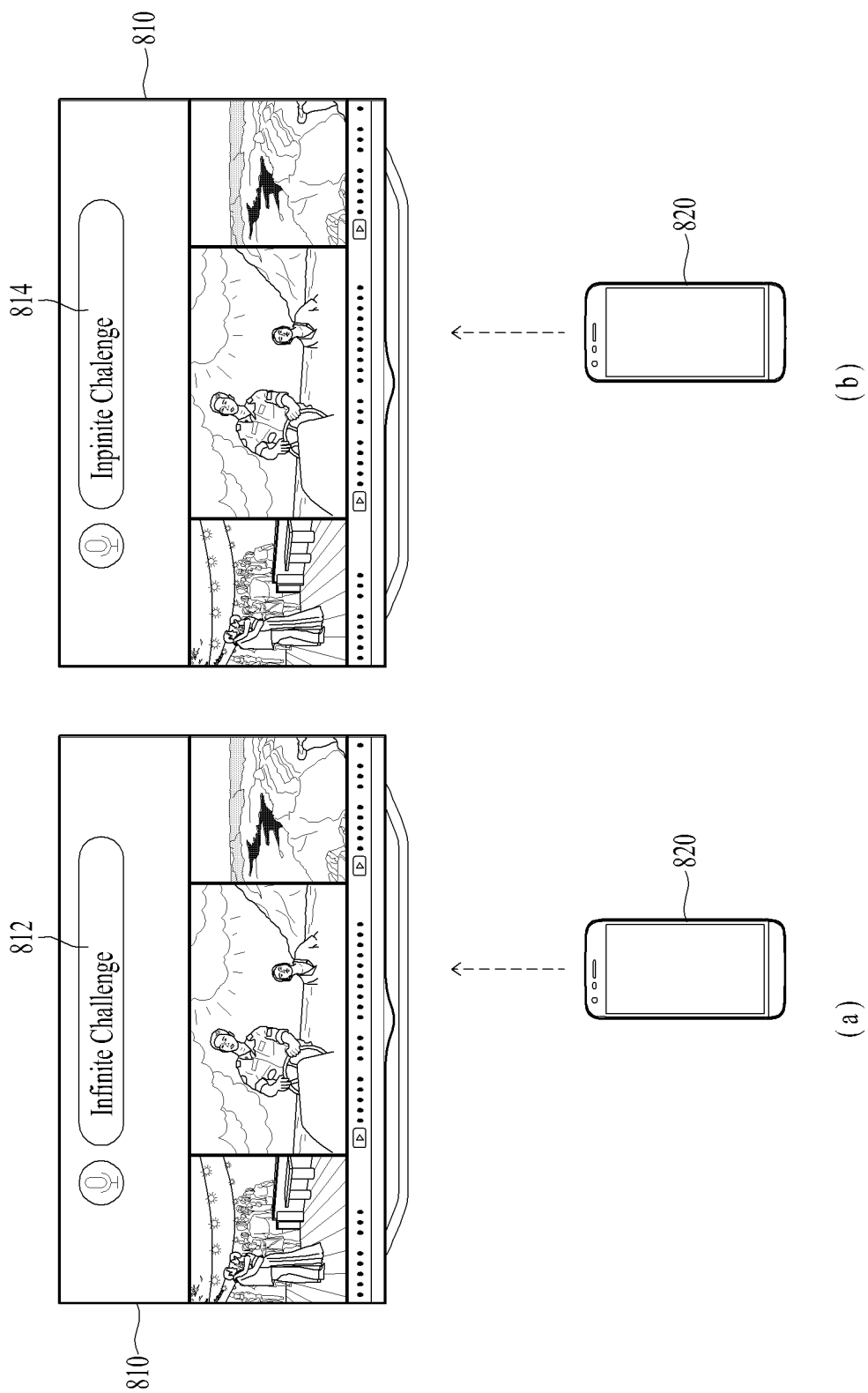
FIG. 8 is a diagram to describe a case of receiving a request for a search service through an input means in a digital device according to the present invention.
Figure 9:
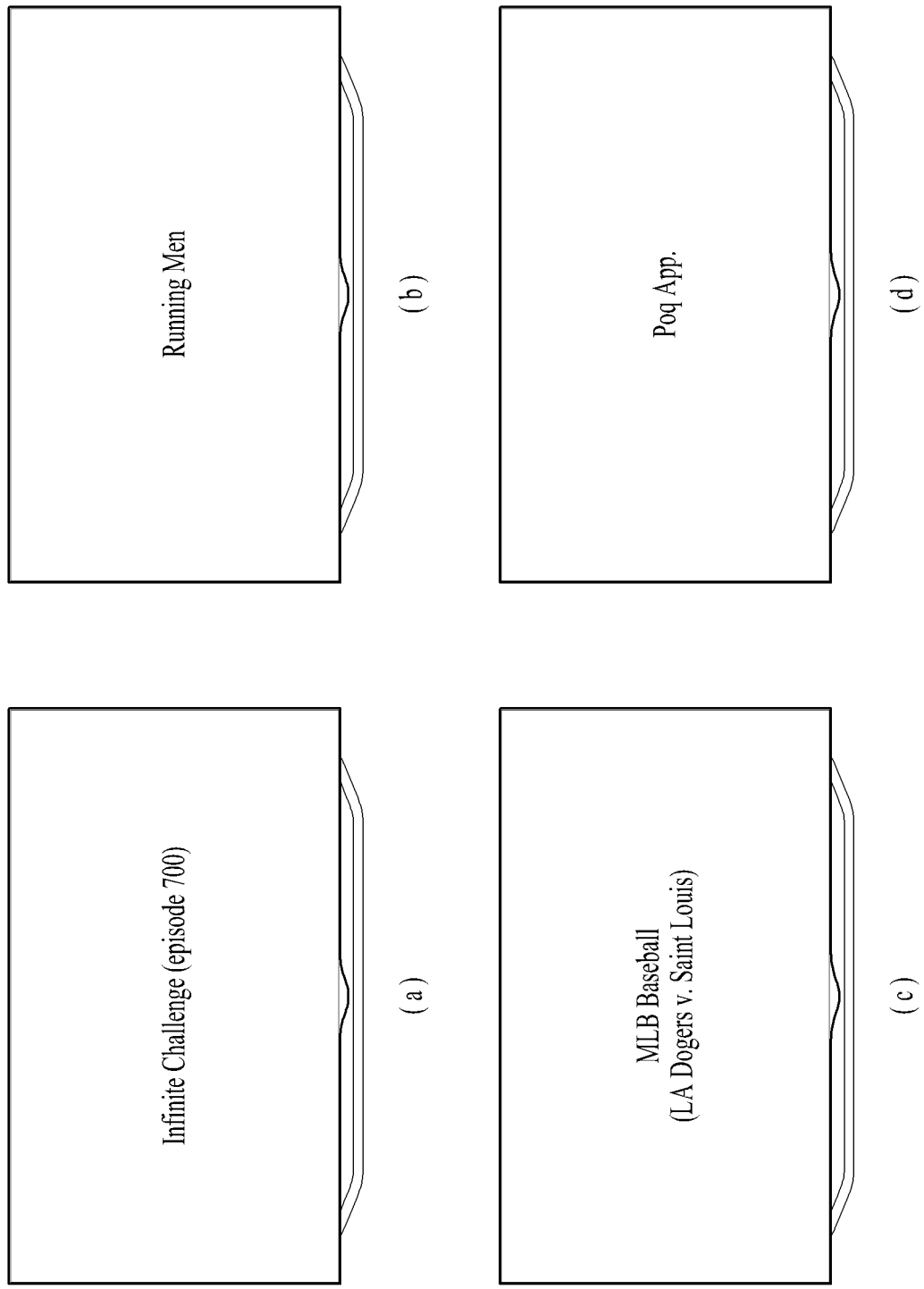
FIG. 9 is a diagram to describe a case of performing a search service automatically without an input means in a digital device according to one embodiment of the present invention.

FIG. 8 is a diagram to describe a case of receiving a request for a search service through an input means in a digital device according to the present invention. FIG. 9 is a diagram to describe a case of performing a search service automatically without an input means in a digital device according to one embodiment of the present invention.

With respect to the present invention, a search service may be performed manually or automatically. FIG. 8 is a diagram showing a manual search service of receiving a search service request and a search word input from a user in a digital TV, and FIG. 9 is a diagram to describe an auto search service.

A search service is described with reference to FIG. 8 as follows.

In FIG. 8, as described above, a mobile terminal 820 is illustrated for example of an input means. Meanwhile, a user may apply a search service request or a search history data through a digital TV 810 or the mobile terminal 820 using key button, voice, gesture, fingerprint recognition, iris recognition, eye-tracking on user's eyes, a combination thereof, or the like. Yet, for clarity, a case of requesting a search service through a mobile terminal using a key button and inputting search history data as a text input through a keyboard provided to the mobile terminal in response to the request is taken as one embodiment. Yet, although a specific scheme or manner is mentioned in the present specification, the corresponding meaning is non-limited by the corresponding scheme or manner and other schemes or manners are apparently usable.

Referring to FIG. 8 (a) and FIG. 8 (b), if a user requests a search service through an application running in a mobile terminal 820, a digital TV 810 provides a search window 812/814. In doing so, the digital TV 810 may be providing a prescribed content/application to a screen before the search service request. Hence, the provided search window 812/814 may be provided in a manner of overlaying the currently provided prescribed content/application screen.

If the digital TV 810 provides the search window 812/814, the user may input search word data through a keyboard provided to the mobile terminal 820. The digital TV 810 displays a search word, which corresponds to a text (search word) inputted through the keyboard of the mobile terminal 820 by the user, on the search window 812/814.

The digital TV 810 may provide an icon, which indicates a voice input support, near the search window 812/814. This is provided for user's convenience. The user may input a search word (or, a search service request) with voice through a microphone of the mobile terminal 820, a microphone embedded in the digital TV 810, microphones available near the user (including microphones of the digital TV 810 and the mobile terminal 820).

Moreover, FIG. 8 (a) shows a case that a correct search word is inputted. FIG. 8 (b) shows a case that an incorrect search word is inputted.

Although the user intends to input a search word ('Infinite Challenge') [FIG. 8 (a)], an unintended search word ['Inpinite Chalenge'] may be inputted.

According to one embodiment of the present invention, as shown in FIG. 8 (b), if a search word unintended by a user (e.g., an incorrect search word) is inputted, although search result data intended by a user is extracted, it may not be added to search history data stored in the memory. To this end, as shown in FIG. 7 (b), validity of search word data may be determined. Meanwhile, although the search result data is provided as intended like the case of the search word data, if a search is not valid, it may be saved to the search history data. In this case, the correct search word data is amended and saved instead of the incorrect search word data. This can be corrected by finding correct search word data based on search result data.

As described above, the digital TV 810 saves the search history data to the memory. In doing so, the saved search history data may have a table form and can be saved separately. Meanwhile, the digital TV 810 may update the search history data saved to the memory after a search service according to a user's request.

First of all, the digital TV 810 does not add or save all search words to the search history data. Instead, the digital TV 810 may determine validity of inputted search word data and then determine whether to save it according to a result of the determination. For instance, a controller of the digital TV 810 determines validity of the inputted search word data. As a result of the determination, the controller may control a search word data determined as an invalid search word data, as shown in FIG. 8 (b), not to be updated (e.g., added to the search history data, etc.).

Meanwhile, as a search result according to a user's search request, if the data intended by the user does not exist, search result data does not exist due to a cause such as a search word incorrectly inputted in making the search request, or search result data does not exist despite the correct search word, a re-search should be performed inconveniently. So to speak, if there exists search data, of which text similarity to at least one of previously search data stored in the search history data is over a predetermined range, the digital TV determines the search word data as valid search word data. As a result of comparing search result data on the basis of the search data determined as valid with the search result data of the search word data stored in the search history data, if redundancy of the search result data is equal to or greater than a preset range, the digital TV may save the search word data having a large number of the search result data to the search history and delete the rest of the search word data from the search history data.

FIG. 9 shows one example of automatically providing a search service instead of a case that a user manually makes a search service request to the digital TV 810 through the mobile terminal 210, which is shown in FIG. 8. Herein, 'automatic', 'automatically' or 'auto' means to exclude a case that a user directly inputs a search word and calls a search service. Yet, it is not mandatory for 'automatic', 'automatically' or 'auto' to mean a case that a user takes no action. So to speak, after a user has watched the same content in the same time every week, if the user is unable to watch the corresponding content at a specific timing, the digital TV performs a search service for a content missed by the user by estimating user's intention. If a search result is detected, although the user does not make the service request, the digital TV may notify the search result for the corresponding content.

Such an auto search service can be performed based on a user's watch pattern, a call and duration time of a previous search service used by a user, a presence or non-presence of a preferred channel/application corresponding to a currently watched application, a user's search service use frequency, a user's major search genre in using a search service, an attribute of a currently watched content, or any combination thereof. This is applicable to a case of an auto search service call additionally after an initial manual search service as well as to an initial auto search service call.

For instance, referring to FIG. 9 (a), assume that a user is watching 'Infinite Challenge (episode 700) or that it is a play time of the corresponding content not watched currently. In this case, if search word data related to Infinite Challenge exists in search history data, a digital TV automatically may perform a search service based on the search word data and notify/display a corresponding search result data. This is applicable to a case of using Running Men shown in FIG. 9 (b), Baseball shown in FIG. 9 (c), or a prescribed application shown in FIG. 9 (d). With respect to at least one of FIGS. 9 (a) to 9 (d), by referring to search history data, a digital TV provides an auto search service result. When the search result data is provided, the digital TV may also provide a related content, a content of the same or similar genre and the like together.

The search may be initially performed in a single server only according to settings or other situations and then performed additionally in one or more other servers based on an additional request or a search result data. The former server may be regarded as a default server that is determined by a manufacturing time of a digital TV or mobile terminal, a user's later setting, or the like. Meanwhile, such a default server may be randomly changeable according to a user's setting or the like.

Particularly, according to one embodiment of the present invention, a digital TV uses the aforementioned auto search service in a second search operation rather than the first search operation mentioned in the foregoing description.

Meanwhile, the digital TV may provide a second search result data extracted as a result of the second search operation in a manner similar to that of the first search result data as well.

For instance, in case of providing a first search result data in response to a manual search service request, since it is a case directly requested by a user, a search service may be regarded as having a priority higher than that of a currently watched content/application. Hence, the first search result data may be instantly displayed on a screen. Moreover, despite that a full screen or a currently watched screen is blocked to some extent, although the digital TV provides the first search result data through a popup window, a PIP window or the like, user's watch intervention may be regarded as minimized.

On the contrary, since an auto search service according to the present invention, e.g., a second search result data is to provide a search result data based on search history data in a prescribed time after a user's search service request, although the second search result data is extracted, it is necessary to determine whether to provide it instantly or at a specific timing. This is because a user may not recognize the second search result data despite that the second search result data is provided or because watching a content/application currently watched by the user may be disturbed.

Hence, in comparison with the aforementioned first search result data, the second search result data may be controlled to be displayed based on at least one of attribute of a currently running application, an identified user, an identity between an identified user and a search service request user, a user's watch pattern, a watched history, a search service request time, a search service use time, a presence or non-presence of preference of a currently watched channel, a user/s current channel surfing, etc.

As described above, according to one embodiment of the present invention, a digital TV provides an auto search service (e.g., a second search) using search history data.

Herein, the search history data may generally mean a search history for a user to use a search service in a digital TV, i.e., a search word, a search time, a search data genre, a search result, a search server, and the like. The search history data includes search word data and various data such as search result data on the basis of the search word data, a condition set by a user for a search, and the like can be saved together. Yet, according to the present invention, as described in the following, such a search history data is different from a related art search history data. Meanwhile, such a search history data may be saved in a table form to the memory. Moreover, the search history data may be saved in URL (uniform resource locator) form to a server such as a cloud or the like.

Figure 10:
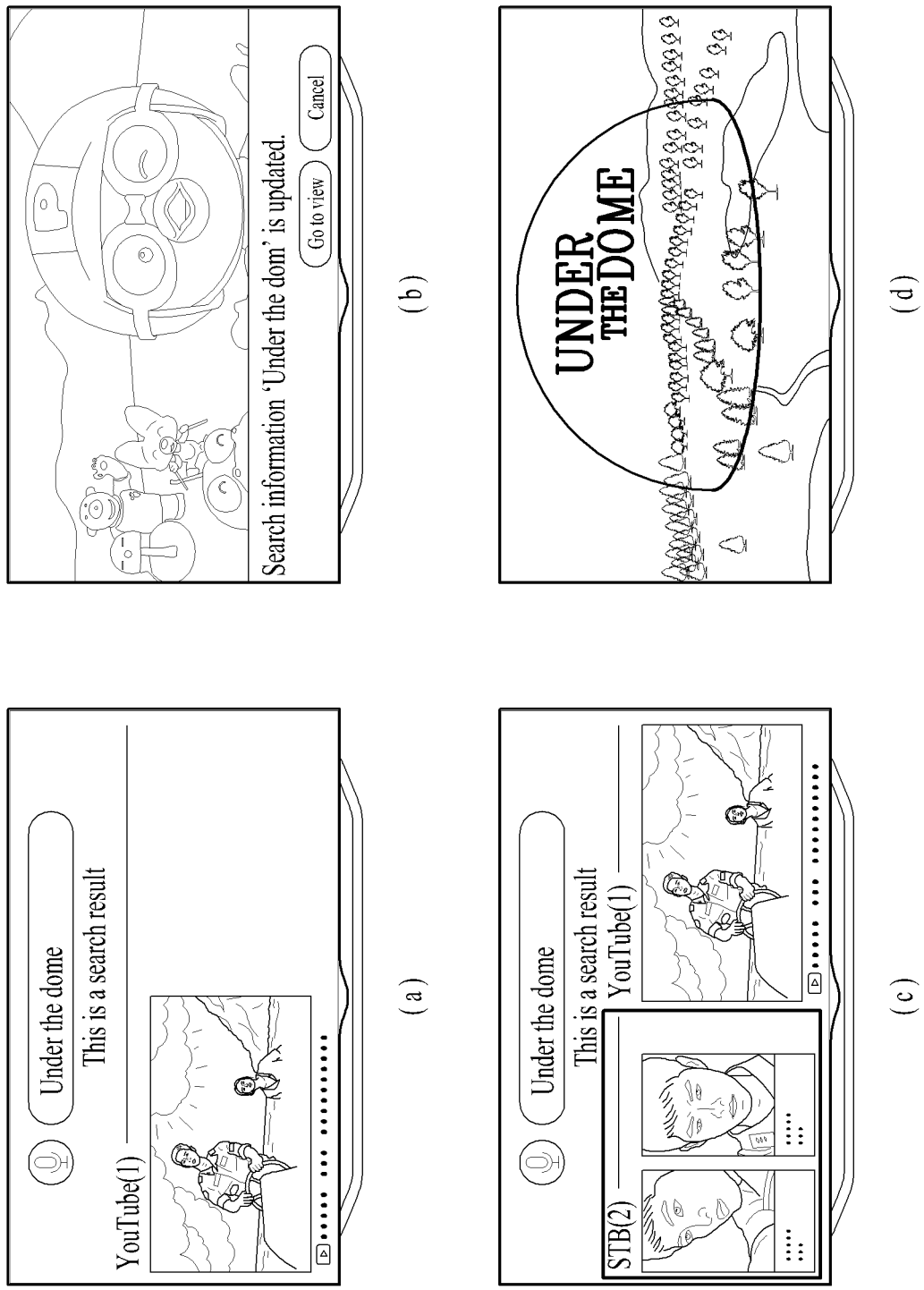
FIG. 10 is a diagram to describe a search service providing process in a digital device according to one embodiment of the present invention.
Figure 11:
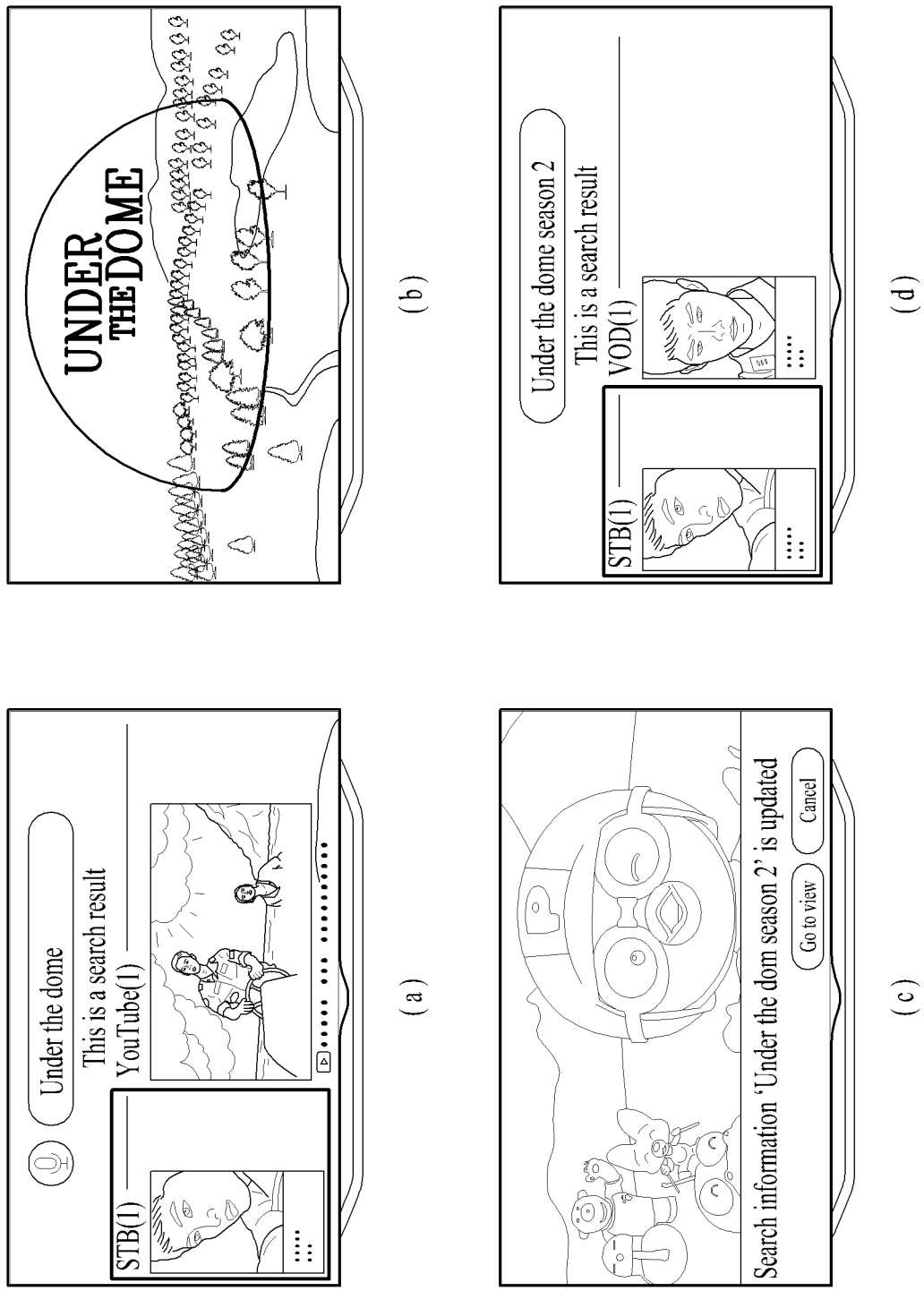
FIG. 11 is a diagram to describe a search service providing process in a digital device according to another embodiment of the present invention.

FIG. 10 is a diagram to describe a search service providing process in a digital device according to one embodiment of the present invention. FIG. 11 is a diagram to describe a search service providing process in a digital device according to another embodiment of the present invention.

Referring to FIG. 10 (a), if a user makes a request for a search service to a digital TV, the digital TV provides a search window. If the user inputs search word data again, the digital TV displays the inputted search word data within the provided search window. Thereafter, the digital TV performs a first search operation. Referring to FIG. 10 (a), a user inputs search word data 'Under the dom', and a digital TV outputs the search word data, i.e., 'Under the dom' to a search window and provides search result data according to a first search operation. As a result of the first operation, as shown in FIG. 10 (a), 1 search result data is found and provided. It can be observed from FIG. 10 (a) that the search result data includes a content runnable through YouTube application. Moreover, the search result data may include various informations (not shown) such as a total play time, a presence or non-presence of current playability, a presence or non-presence of a pay/free content, a previously watched history, and the like. In providing the search result data, the digital TV provides a representative thumbnail image, thereby facilitating identification of the corresponding data. Besides, the digital TV further provides a content type identification icon for search result data, thereby enabling a corresponding content to be identified as video data, audio data, or the like. Such a content type identification icon may be available for a usage of classification of the entire search result data. For instance, when a plurality of search result data exist, if a video content identification icon is selected, video contents among a plurality of the search result data may be classified and provided or priorities of the video contents are raised and then provided.

Yet, despite that the digital TV provides the search result data as a result of the first search operation, as shown in FIG. 10 (a), a content desired by a user may not exist. This can be determined by the digital TV from a user's search service end request, a new search word data input, a case of watching a content selected from a first search result data less than a predetermined time, and the like.

Thus, if a user fails to obtain a desired search result data from the first search result data despite a search service request, the present invention adds the search word data to the search history data stored in the memory.

For at least one search word data (e.g., the added search word data) on the basis of the search history data, the digital TV performs a second search operation for checking whether a substance continuing to be updated for search result data exists despite a non-presence of a separate search service request after a search service request using the corresponding search word data. Such a second search operation may be performed in a background for example. Meanwhile, the second search operation may follow a flow determined by settings or the like. And, the second search operation may be performed periodically/aperiodically.

As a result of the second search operation, if there is an updated substance in comparison with the first search result data, as shown in FIG. 10 (b), the digital TV may notify it on a screen to be identifiable by a user.

If the user selects the notification, as shown in FIG. 10 (c), the digital TV may provide a result of the second search operation, i.e., a second search result data to the screen. Referring to FIG. 10 (c), a content previously included in the first search result data for the same search word data may be provided in a manner that a priority of the corresponding content is adjusted to be lower than that of a content added to the second search result data as a result of the second search operation. Or, the content included in the first search result data is deleted by being determined as a content not desired by a user and may not be provided. From FIG. 10 (c), it can be observed that the second search result data is provided in a manner of updating information on a future program such as EPG/ESG, VOD or the like through a tuner and STB according to the notification selection shown in FIG. 10 (b). This is non-limited by the aforementioned substance.

If a prescribed data is selected from the search result data provided as the second search result data in FIG. 10 (c), as shown in FIG. 10 (d), the digital TV provides a content corresponding to the selected data to the screen. In doing so, when the content is provided, it can be provided as a full screen in a manner of totally replacing a currently watched content. In some cases, the content may be provided together with the currently watched content through a popup window, an OSD window, a PIP window, a POP window (if a plurality of search result data are selected), or the like, or through split screens.

Meanwhile, if there is a content selected from the second search result data, as shown in FIG. 10 (c) or FIG. 10 9d), the digital TV updates search history data by deleting a search word data added to the search history data.

Unlike FIG. 10, a processing operation of a digital TV for a case that series information is included in first/second search result data is described in detail with reference to FIG. 11 as follows.

FIG. 11 (a) may be regarded as one of the first search result data and the second search result data shown in FIG. 10 (a) or FIG. 10 (c). For clarity of the following description, the second search result data is assumed.

If a specific search result data is selected from a second search result data provided like FIG. 11 (a), a content corresponding to the selected specific search result data is provided to a screen [FIG. 10 (d), FIG. 11 (b)]. In doing so, as shown in FIG. 11 (b), a digital TV provides the corresponding content to the screen and determines whether a previously watch history information on the content exists. If the previously watch history information on the content exists, the digital TV can be aware that series information exists for a corresponding search word data. Although a desired content is found from the second search result data and watched, as described above, the digital TV may update search history data in a manner of adding the series information to the search word data included in the search history data instead of deleting the search word data from the search history data.

Hence, the digital TV performs a third search operation based on the search history data including the search word data having the series information added thereto. As a result of performing the third search operation, if a content different from the first or/and second search result data or a content corresponding to the added series information is found, as shown in FIG. 11 (c), the digital TV notifies it to the screen. If the notification shown in FIG. 11 (c) is selected, as shown in FIG. 11 (d), the digital TV may provide a third search result data according to the result of the third search operation. When the search result data based on the series information is notified in FIG. 11 (c), if the notification is selected as above, the corresponding content may be provided in a manner of being directly played like FIG. 11 (b) instead of FIG. 11 (d).

Figure 12:
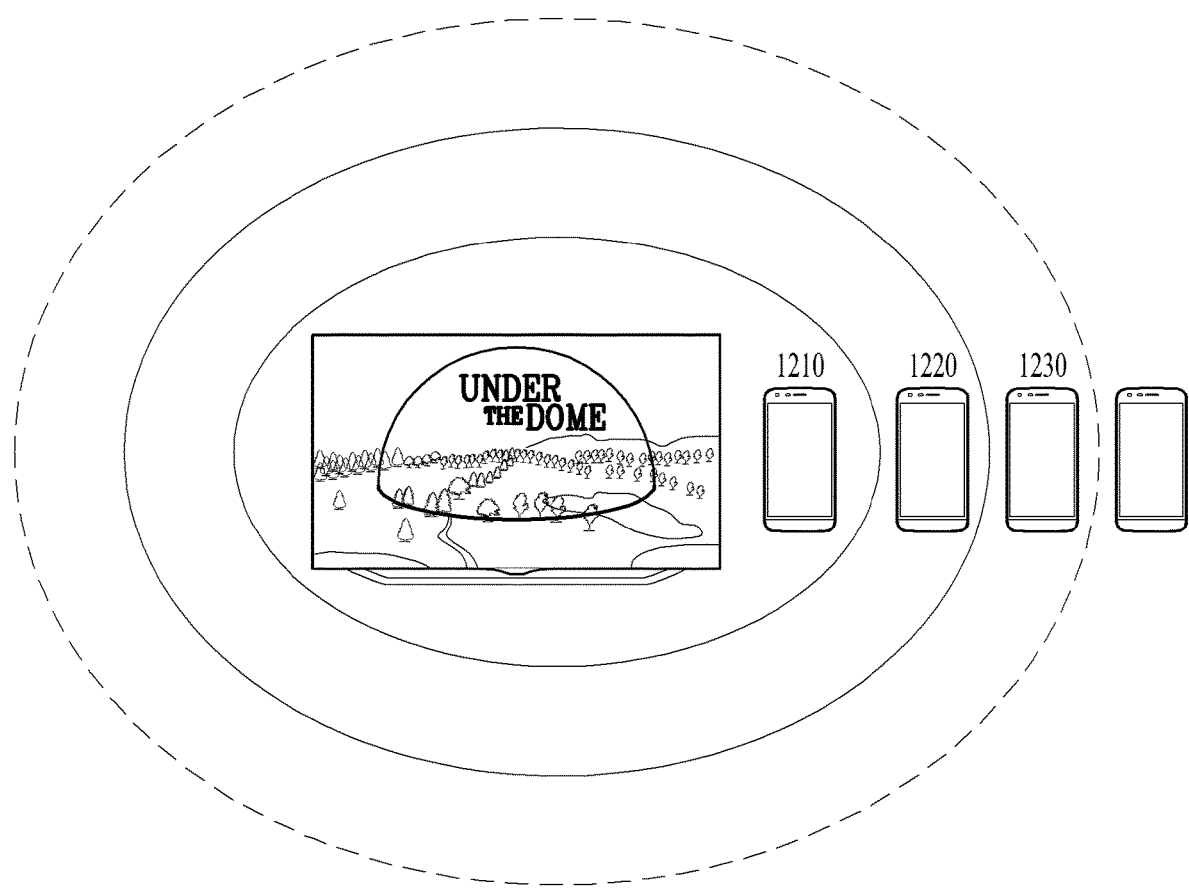
FIGS. 12 to 14 are diagrams to describe a personalized search service providing process in a digital device according to one embodiment of the present invention.
Figure 13:
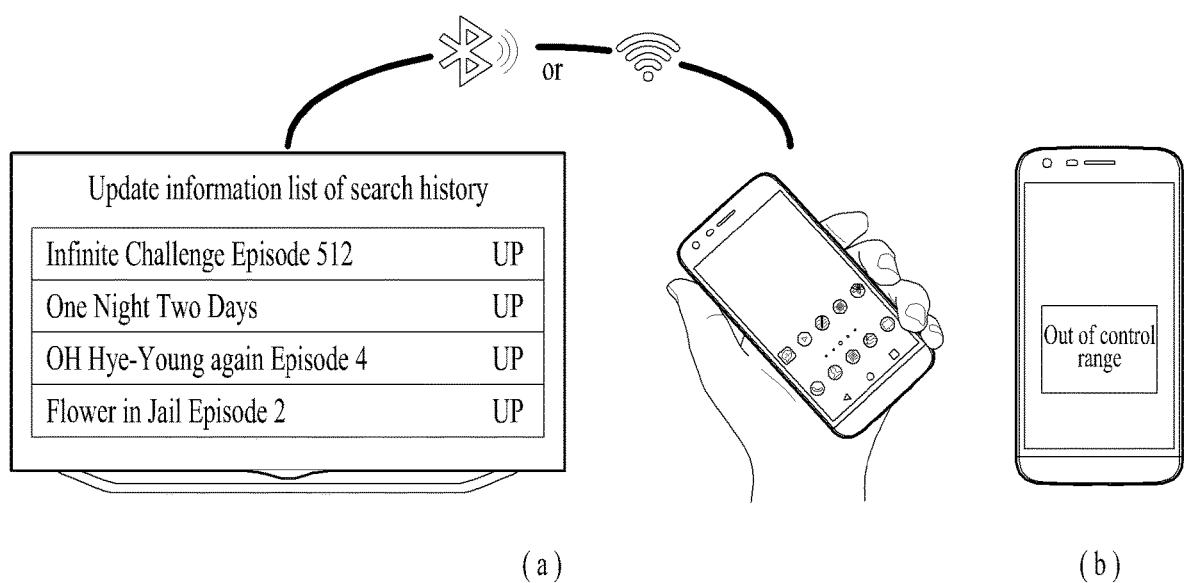
Figure 14:

FIGS. 12 to 14 are diagrams to describe a personalized search service providing process in a digital device according to one embodiment of the present invention.

FIG. 12 relates to a transmission of search result data based on locations of a digital TV and a mobile terminal for a personalized search service provision for example. The location base may be determined depending on where the mobile terminal is located with reference to the location of the digital TV.

For instance, with reference to the digital TV, if the mobile terminal is located within a range of a first area 1210, search result data according to a search service request is provided not to a screen of the mobile terminal but to a screen of the digital TV. Yet, if the mobile terminal is located in a range of a second area 1220 or a third area 1230, the search result data is provided not to the screen of the digital TV but to the screen of the mobile terminal. Herein, if the mobile terminal is located in the second area 1220, it is notified that the search result data has been updated. Hence, a user can be guided to move into the first area 1210 in which the digital TV is located and check details of the search result data through the digital TV. Yet, when the mobile terminal is located in the range of the third area 1230, if the notification is displayed and selected in consideration of a distance from the digital TV, an updated search result data may be directly viewed on the screen of the mobile terminal or an updated search result data may be viewed without the notification.

In the above description, as shown in FIG. 13 (a), the digital TV may send the updated search result data in the search history data to the mobile terminal by a prescribed communication protocol. For instance, if the mobile terminal exists in the first area 1210, Bluetooth communication protocol is used. If the mobile terminal exists in the second area 1220 or the third area 1230, the updated search result data and notification may be sent by a communication protocol (e.g., Wi-Fi, Wi-Fi Direct, LTV, etc.). Besides, if the search result data is based on text data according to a type or kind of the search result data, it is sent by Bluetooth communication protocol. Yet, if audio/image data is included, a communication protocol such as Wi-Fi and the like can be used.

Meanwhile, if the mobile terminal moves away from an AP range based on the same communication network of the digital TV or is connected to another communication network, as shown in FIG. 13 (b), guide data indicating the deviation from a control range is provided only but search result data may not be provided. In this case, the digital TV does not save the search result data on the screen but may be able to add and save information on an updated search result data to the search history data.

Moreover, the digital TV may collect state information of the mobile terminal and determine whether to send search result data to the mobile terminal in the first to third areas 1210, 1220 and 1230. For instance, although the mobile terminal is located in the first to third areas 1210, 1220 and 1230, while a user is performing an operation (e.g., a call, a message service use, etc.) through the mobile terminal according to the running of a basic function, a basic application or a preferred application of the mobile terminal, a notification is performed only, a timing of the notification is delayed, or the notification is not performed. On the other hand, when the mobile terminal is located in the first to third areas 1210, 1220 and 1230, if a user is performing san additional operation (e.g., a function running, a web browser running, etc.) as well as a basic function of the mobile terminal, the digital TV may enable the notification, search result data together with the notification, and the like to be directly checked on the mobile terminal together.

Meanwhile, if the user provided with the notification and search result data for an updated search data through the mobile terminal moves into the first area 1210, the substance provided by the user until now can be provided on the digital TV in continuation.

FIG. 14A and FIG. 14B show screens for providing search result data, yet, unlike FIG. 12 and FIG. 13, FIG. 14 shows that search result data is provided through filtering. Herein, the meaning of 'filtering' includes a change of a search result data arrangement order as well as a deletion of some od search result data.

Referring to FIG. 12, the filtering may be performed by various references. For example, such references may include at least one of a user, a priority, a content attribute, a content genre, a presence or non-presence of pay/free data, a search time, a viewable rating information in search result data, and any combination thereof. Importance between the above references, a priority and the like may be determined according to an item set for a product in manufacturing the product or a user's selection, which can be randomly changed.

For instance, if a user currently watching a digital TV is a user having the identity with a user having requested a search service, the user among the references may provide search result data through a screen. The identity determination may be performed based on login information on an application currently running in the digital TV or the foreground or background and the like. When the latter is taken as one example, referring to FIG. 14 (*a*), in case that login information of a digital TV currently has login information of a POQ application or that a user currently uses the POQ application by logging in to the POQ application, if POQ application data is included in providing search result data, data can be arranged and provided so as to enable the corresponding application data to be identified more easily and quickly than other data. On the other hand, referring to FIG. 14 (*b*), in case that a user currently uses Netfix application by logging in thereto, when search result data are arranged, the Netfix application data can be preferentially provided in a manner of being arranged. Thus, with respect to a user currently watching a digital TV or a priority mentioned in the following description, as shown in FIG. 14 (*a*) or FIG. 14 (*b*), search result data may be provided by filtering (e.g., arrangement, etc.).

The priority among the references may provide search result data in a manner of arranging search result data according to priorities by giving different priorities to the search result data with reference to a user's previous search history or use pattern, a watch pattern, an attribute or type of a currently watched content, an issued date/hour of search data, a presence or non-presence of pay/free content, a total play time and the like. For instance, while POQ application is currently used through a digital TV, if search result data is updated, the POQ application can be set to have a top priority. Meanwhile, if search result data having the same priority exist, the search result data may be provided in a folder form or priorities can be differentiated again in consideration of other factors related to the priority, e.g., a presence or non-presence of a pay/free content, an issued date of the corresponding content, a valid period and the like.

The content attribute or content genre among the references may provide search result data in a manner of enabling a same attribute or genre to be preferentially identifiable in consideration of an attribute or genre of a content currently watched through a digital TV by a user, an attribute or genre of a content watched at the time of a search service request, and the like.

A presence or non-presence of pay/free data among the references may provide search result data in a manner of arranging a free data to be identifiable more preferentially than a pay data if the pay data and the free data coexist in the search result data. Meanwhile, in case of the pay data, it is preferable that a user is guided to a pay procedure such as a password input and the like instead of paying a cost directly according to a selection of the pay data in consideration of a user's mistake or the like. Meanwhile, in case of a content for which a user applies a pay subscription service, pay search result data may be preferentially provided. Since pay data may include information more than that of free data or have a content quality (e.g., resolution, etc.) higher than that of the free data, an intention of the user having subscribed to a pay service is to desire provision of a service of a high quality rather than discrimination of pay/free data. Yet, in this case, a separate notification for a pay service use is preferably provided.

Besides, the search time among the references may preferably provide search result data after a search service request time slot at least instead of providing a presence or non-presence of an update of the search result data before a time corresponding to a time slot in which a user has requested a search service. This may be associated with a viewable rating information mentioned in the following. For instance, a viewable rating information of a content desired by a viewer watching the content between 9 AM and 6 PM may be different from that of a content desired by a viewer watching the content after 9 PM or 11 PM. So to speak, as a content of a viewable rating that requires adult certification is updated, if the content is provided not to the corresponding user but to another user, it may result in a result not desired by the corresponding user.

Meanwhile, a digital TV may adjust an output method through comparison with viewable rating information previously set for at least one or all of search result data. For instance, if at least one content corresponding to an adult certification required viewable rating is included in search result data, it is notified not to a digital TV but to a mobile terminal of a user of a corresponding search service request. And, the content may be provided according to a corresponding selection. Moreover, according to a recognition of at least two users like a family as a result of determination in a digital TV, a watch time slot (e.g., between 6 PM and 10 PM) for at least two users in consideration of a watch pattern and the like, or a viewable rating, as described above, an update of search result data can be preferentially notified/displayed on a mobile terminal rather than a digital TV despite FIG. 12.

Figure 15:
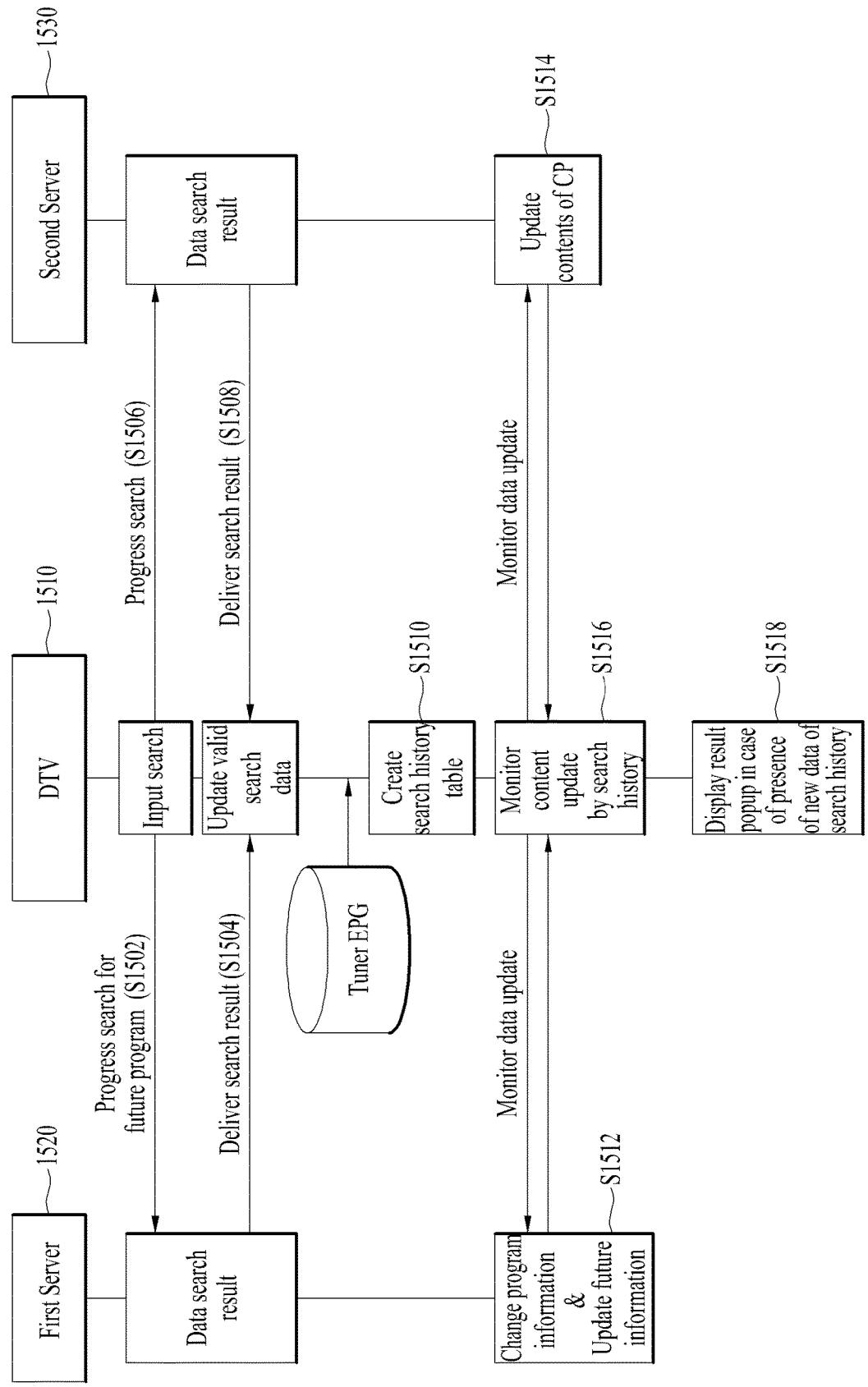
FIG. 15 is a diagram to describe a flow of operation between devices for a search service providing process according to one embodiment of the present invention.

FIG. 15 is a diagram to describe a flow of operation between devices for a search service providing process according to one embodiment of the present invention.

A digital TV 1510 may provide an advanced search service according to the present invention using at least one server. For clarity, FIG. 15 exemplarily shows a first server 1520 and a second server 1530. Herein, the first server 1520 and the second sever 1530 may include an EPG dedicated server and a content provider (CP) server, respectively.

If search word data is inputted and a search service is requested, the digital TV 1510 may make a request for search result data for the search word data to at least one of the first server 1520 and the second sever 1530 and receive the requested search result data from the corresponding server [S1502 to S1508].

The digital TV 1510 may create a search history table by determining validity of the received search result data of the respective servers [S1510]. Herein, the 'creation' means an initial creation. And, a previous creation may be regarded as an update.

In order to monitor an update of a content, i.e., search result data for search word data included in the search history table, the digital TV 1510 makes a request for search result data updated periodically/aperiodically to the respective servers [S1512 to S1516]. Such a process may be performed in various ways such as polling and the like.

If the updated search result data is received from at least one server, the digital TV 1510 updates the search history table and provides it to a user [S1518].

Therefore, according to various embodiments of the present invention, a search service matching up to a user's intention in a digital device can be provided, an advanced search service can be provided based on search history data, and product satisfaction and purchase desire can be enhanced in a manner of improving a search service in a digital device through an advanced search service.

The digital device and data processing method therein disclosed in the present specification can be achieved by combination of structural elements and features of the present invention. Each of the structural elements or features should be considered selectively unless specified separately. Also, some structural elements and/or features may be combined with one another to enable various modifications of the embodiments of the present invention.

Meanwhile, the digital device operating method disclosed in the present specification can be implemented in a program recorded medium, which can be read by a processor provided to a digital device, as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations. Further, the recording medium readable by a processor is distributed to a computer system connected to a network, whereby codes readable by the processor by distribution can be saved and executed.

Besides, it will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents. And, such modifications and variations should not be individually construed from the technical idea of the present invention.

What is claimed is:

1. A digital device, comprising:
a first receiving unit for receiving application data;
a second receiving unit for receiving a signal including a request for a search service and search word data for the search service;
a memory for storing search history data;
a controller configured to:
perform a first operation based on the search word data in response to the received search service request,
control to display first search result data on a screen,
if the displayed first search result data is not valid, add the received search word data to the search history data, and
control to display second search result data on the screen by performing a second search based on the search word data included in the search history data after the search service; and
a display unit displaying the application data, the first search result data and the second search result data,
wherein although at least one item is selected from one or more items included in the search result data, if an application of the selected item is not executed or watched over a predetermined time, the controller determines the corresponding search result data as invalid search result data, and
wherein while the search result data is displayed, if search word data similar to the search word data is re-inputted within a predetermined time, the controller determines the corresponding search result data as invalid search result data.

2. The digital device of claim 1, wherein the controller determines validity of the search word data, and
wherein as a result of the determination, the controller controls such that an invalid search word data is not saved to the search history data.

3. The digital device of claim 1, wherein if any one of one or more items included in the search result data is not selected, the controller determines the corresponding search result data as invalid search result data.

4. The digital device of claim 1, wherein the controller determines whether an application having a previously watched history is included in the search result data,
wherein if the application having the previously watched history is included in the search result data, the controller determines whether series information is included in the search result data,
wherein if the search result data fails to include the series information, the controller deletes the search word data from the search history data, and
wherein if the search result data includes the series information, the controller updates the search history data by including the series information in the search word data.

5. The digital device of claim 1, wherein if a plurality of the first or second search result data exist, the controller preloads a predetermined number of search result data or search result data over a predetermined priority among a plurality of the search result data.

6. The digital device of claim 1, wherein if the application data is played over a prescribed time, the controller sends at least one of the first search result data and the second search result data to an external device.

7. The digital device of claim 1, wherein if an external device having newly entered an AP (access point) for the digital device exists, the controller automatically performs the search service by referring to search service request user data in the search history data and notifies the search result data according to the automatically performed search service to the external device having newly entered the AP for the digital device.

8. The digital device of claim 1, wherein if the displayed search result data is valid, the controller controls the corresponding search word data to be deleted from the search history data.

9. A digital device, comprising:
a first receiving unit for receiving application data;
a second receiving unit for receiving a signal including a request for a search service and search word data for the search service;
a memory for storing search history data;
a controller configured to:
perform a first operation based on the search word data in response to the received search service request,
control to display first search result data on a screen,
if the displayed first search result data is not valid, add the received search word data to the search history data, and
control to display second search result data on the screen by performing a second search based on the search word data included in the search history data after the search service; and
a display unit displaying the application data, the first search result data and the second search result data,
wherein if search data exists, of which text similarity to at least one of previously search data stored in the search history data is over a predetermined range, the controller determines the search word data as valid search word data, and
wherein as a result of comparing search result data on the basis of the search data determined as valid with the search result data of the search word data stored in the search history data, if redundancy of the search result data is equal to or greater than a preset range, the controller saves the search word data having a large number of the search result data to the search history and deletes the rest of the search word data from the search history data.

* * * * *